US010030388B2

(12) United States Patent
Yonebayashi et al.

(10) Patent No.: US 10,030,388 B2
(45) Date of Patent: Jul. 24, 2018

(54) PANEL HAVING RECESSES AND PROTRUSIONS

(71) Applicant: NIPPON STEEL & SUMITOMO METAL CORPORATION, Tokyo (JP)

(72) Inventors: Toru Yonebayashi, Tokai (JP);
Yoshiaki Nakazawa, Takarazuka (JP);
Nobutaka Shimizu, Kimitsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/034,586

(22) PCT Filed: Nov. 25, 2014

(86) PCT No.: PCT/JP2014/081064
§ 371 (c)(1),
(2) Date: May 5, 2016

(87) PCT Pub. No.: WO2015/080084
PCT Pub. Date: Jun. 4, 2015

(65) Prior Publication Data
US 2016/0273222 A1    Sep. 22, 2016

(30) Foreign Application Priority Data

Nov. 26, 2013  (JP) ................... 2013-243823

(51) Int. Cl.
*E04C 2/30* (2006.01)
*E04C 2/32* (2006.01)
(Continued)

(52) U.S. Cl.
CPC ............. *E04C 2/30* (2013.01); *B62D 25/00* (2013.01); *E04C 2/08* (2013.01); *E04C 2/20* (2013.01); *E04C 2/326* (2013.01); *B32B 3/28* (2013.01)

(58) Field of Classification Search
CPC ..... B32B 3/28; E04C 2/30; E04C 2/08; E04C 2/20; E04C 2/326; B62D 25/00
See application file for complete search history.

(56) References Cited

U.S. PATENT DOCUMENTS 2,481,046 A * 9/1949 Scurlock ............... E04C 2/3405
219/78.12
2,858,247 A * 10/1958 De Swart ............... E04C 2/3405
428/180
(Continued)

FOREIGN PATENT DOCUMENTS

JP          4402745      1/2010
JP        2011-027248    2/2011
(Continued)

*Primary Examiner* — Babajide A Demuren
(74) *Attorney, Agent, or Firm* — Clark & Brody

(57) ABSTRACT

A panel comprises a reinforcing unit including a plurality of first rectangular regions and a plurality of second rectangular regions. The first and second rectangular regions are in rows and columns, the first and second rectangular regions in each row being arranged alternately and the first and second rectangular regions in each column being arranged alternately. Each of the first rectangular regions includes a fully-covering first protrusion protruding in a first direction perpendicular to an imaginary reference plane and having a flat top surface. Each of the second rectangular regions includes a partially-covering second protrusion protruding in a second direction opposite to the first direction and having a flat top surface. A partially-covering reinforcing protrusion extends between opposite sides and protrudes in the first direction and having a flat top surface. The top surface of the reinforcing protrusion forms one face together with the top surface of the first protrusion.

12 Claims, 31 Drawing Sheets

(51) Int. Cl.
    *B62D 25/00*     (2006.01)
    *E04C 2/08*     (2006.01)
    *E04C 2/20*     (2006.01)
    *B32B 3/28*     (2006.01)

(56) References Cited

U.S. PATENT DOCUMENTS

| | | | | |
|---|---|---|---|---|
| D673,779 S * | 1/2013 | Takahashi | ......................... | D5/54 |
| 8,714,631 B2 * | 5/2014 | Takahashi | .............. | B21D 47/00 |
| | | | | 296/187.04 |
| 9,090,288 B2 * | 7/2015 | Takahashi | .............. | B21D 13/10 |
| 9,108,239 B2 * | 8/2015 | Takahashi | .............. | B21D 13/10 |
| 2013/0108885 A1 * | 5/2013 | Takahashi | ................ | B60J 5/045 |
| | | | | 428/595 |
| 2013/0183498 A1 * | 7/2013 | Takahashi | .............. | B21D 13/10 |
| | | | | 428/180 |
| 2013/0295405 A1 * | 11/2013 | Takahashi | .............. | B21D 47/00 |
| | | | | 428/604 |
| 2017/0120553 A1 * | 5/2017 | Ros | ........................ | B32B 3/12 |

FOREIGN PATENT DOCUMENTS

| | | |
|---|---|---|
| JP | 2011-101893 | 5/2011 |
| JP | 2011-110847 | 6/2011 |
| JP | 2011-110954 | 6/2011 |
| JP | 2012-051004 | 3/2012 |
| JP | 5218633 | 6/2013 |

* cited by examiner

PANEL HAVING RECESSES AND PROTRUSIONS

TECHNICAL FIELD

The present invention relates to a panel, and more particularly, to a panel with high rigidity.

BACKGROUND ART

Panels used in automobiles or the like are required to be light-weight. To provide a light-weight panel, the plate thickness may be reduced, for example. However, reduced plate thickness leads to decreased rigidity. In view of this, proposals haven been made to provide recesses and protrusions to provide a certain rigidity without increasing plate thickness. The recesses and protrusions are required to be shaped so as to improve rigidity with the minimum depth in order to avoid contact with other components.

Japanese Patent No. 5218633 discloses a panel. The panel includes a plurality of protrusions and a plurality of recesses. Each protrusion has a flat top surface. Each recess has a flat bottom surface. The protrusions and recesses are in rows and columns, where the protrusions and recesses in each row are arranged alternately and the protrusions and recesses in each column are also arranged alternately.

JP 2012-51004 A discloses a plate having recesses and protrusions. This plate includes a plurality of protrusions and a plurality of recesses. Each protrusion has a flat top surface. Each recess has a flat bottom surface. Each of the top and bottom surfaces has a pair of extending portions and a connecting portion connecting the extending portions. The protrusions and recesses are in rows and columns, where the protrusions and recesses in each row are arranged alternately and the protrusions and recesses in each column are also arranged alternately. In plan view, each of the extending portions of one of a top surface and a bottom surface is located between the extending portions of the other.

Japanese Patent No. 4402745 discloses a heat insulator. The heat insulator includes a large number of, protrusions. Each protrusion is hexagonal in shape in plan view, and the vertical cross section that passes through opposite vertices is arc-shaped. The portions of the flat plate located between the protrusions are not shaped as a straight line.

JP 2011-27248 A discloses a plate having recesses and protrusions. In this plate, each recess/protrusion includes a first region, a second region and a third region with different protrusion heights as measured in the thickness direction. These regions are distributed such that regions of the same type are not arranged in a continuous manner and each region is contact with two other regions of a different type.

JP 2011-101893 A discloses a plate having recesses and protrusions. In this plate, each recess/protrusion has a first protruding portion, a second protruding portion and an intermediate face. The first protruding portion is shaped as a dodecagonal pyramid or a truncated dodecagonal pyramid. The second protruding portion protrudes in a direction opposite to that of the first protruding portion and is shaped as a hexagonal pyramid or a truncated hexagonal pyramid. The intermediate face is a rectangular face provided in the intermediate reference plane.

JP 2011-110847 A discloses a plate having recesses and protrusions. This plate includes first columns each having first regions and intermediate regions arranged alternately to form a straight line, and second regions and intermediate regions. Such first and second columns are arranged alternately. The first regions in a first column are adjacent to the intermediate regions in a second column. The second regions in a second column are adjacent to the intermediate regions in a first column. The first and second regions are connected by first skirts. The intermediate regions and first regions are connected by second skirts. The intermediate regions and second regions are connected by third skirts.

JP 2011-110954 A discloses a vehicle panel. The vehicle panel includes an interior panel. The interior panel includes recesses and protrusions. Each recess/protrusion has a first protruding portion, a second protruding portion and an intermediate face. The first protruding portion is shaped as a dodecagonal pyramid or a truncated dodecagonal pyramid. The second protruding portion protrudes in a direction opposite to that of the first protruding portion and is shaped as a hexagonal pyramid or a truncated hexagonal pyramid. The intermediate face is a rectangular face provided in the intermediate reference plane.

DISCLOSURE OF THE INVENTION

The present inventors investigated the rigidities of the plates with the recesses and protrusions described in the above publications. They found out that the plates with the recesses and protrusions described in Japanese Patent No. 5218633 and JP 2012-51004 A have improved rigidity (stiffness) over the plates with the recesses and protrusions described in the other publications. At the same time, they discovered that the recesses and protrusions described in Japanese Patent No. 5218633 and JP 2012-51004 A have the following disadvantages.

In the panel described in Japanese Patent No. 5218633, it is easy to provide regions formed by flat faces divided by ridges. Thus, when a torsional deformation occurs in the panel, the load propagates throughout the panel since the ridges located at the borders between the recesses and protrusions are shared, and a large in-plane shear is produced in every flat face defined by the ridges such that an in-plane shear stress can easily be produced uniformly in the entire panel. This provides a certain torsional rigidity.

However, in the above panel, the recesses/protrusions are shallow and the borders between the recesses and protrusions extend in rows and columns. This results in a small second moment of area. As a result, flexural rigidity is small. Particularly, second moment of area is at its minimum at the borders between the protrusions and recesses such that deformation can easily occur. That is, flexural rigidity decreases.

In the plate described in JP 2012-51004 A, the borders between the protrusions and recesses do not extend in rows and columns. This prevents second moment of area from decreasing at the borders between the protrusions and recesses. As a result, a bending deformation is unlikely to occur at the borders between the protrusions and recesses. Since second moment of area is high in any cross section, a certain flexural rigidity is provided.

However, the regions formed by flat faces where a shear force occurs in the plate are smaller than in the panel described in Japanese Patent No. 5218633. Thus, an in-plane shear stress is less likely to be produced uniformly in the entire panel when a torsional deformation occurs. As such, it is difficult to provide a certain torsional rigidity.

An object of the present invention is to provide a panel that simultaneously provides a certain flexural rigidity and a certain torsional rigidity.

A panel in an embodiment of the present invention includes a reinforcing unit. The reinforcing unit includes a plurality of first rectangular regions and a plurality of second rectangular regions. The first and second rectangular regions are in rows and columns, the first and second rectangular regions in each row being arranged alternately and the first and second rectangular regions in each column being arranged alternately. Each of the first rectangular regions includes a first protrusion. The first protrusion is fully-covering and protrudes in a first direction perpendicular to an imaginary reference plane and has a flat top surface. Each of the second rectangular regions includes a second protrusion and a reinforcing protrusion. The second protrusion is partially-covering and protrudes in a second direction opposite to the first direction and has a flat top surface. The reinforcing protrusion extends between opposite sides and is partially-covering and protrudes in the first direction and has a flat top surface. The top surface of the reinforcing protrusion forms one face together with the top surface of the first protrusion.

A panel in an embodiment of the present invention simultaneously provides a certain flexural rigidity and a certain torsional rigidity.

EMBODIMENTS FOR CARRYING OUT THE INVENTION

Figure 1:
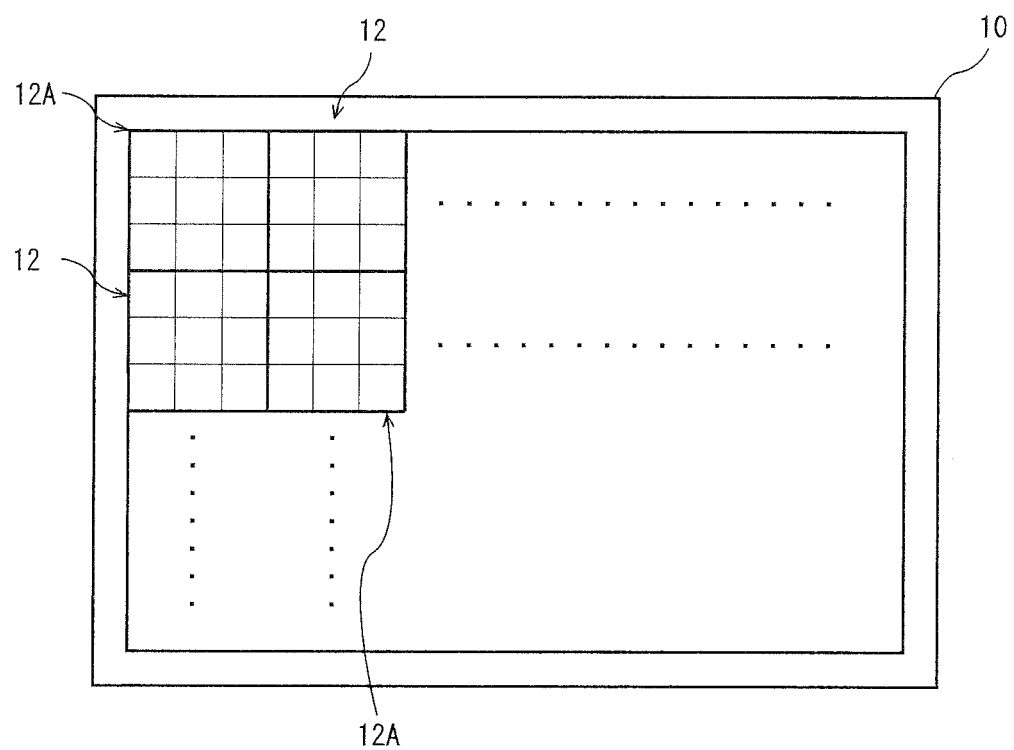
FIG. 1 a plan view of a panel in a first embodiment of the present invention.

A panel in an embodiment of the present invention includes a reinforcing unit. The reinforcing unit includes a plurality of first rectangular regions and a plurality of second rectangular regions. The first and second rectangular regions are in rows and columns, the first and second rectangular regions in each row being arranged alternately and the first and second rectangular regions in each column being arranged alternately. Each of the first rectangular regions includes a first protrusion. The first protrusion is fully-covering and protrudes in a first direction perpendicular to an imaginary reference plane and has a flat top surface. Each of the second rectangular regions includes a second protrusion and a reinforcing protrusion. The second protrusion is partially-covering and protrudes in a second direction opposite to the first direction and has a flat top surface. The reinforcing protrusion extends between opposite sides and is partially-covering and protrudes in the first direction and has a flat top surface. The top surface of the reinforcing protrusion forms one face together with the top surface of the first protrusion.

In the panel described above, the top surface of a reinforcing protrusion forms one face together with the top surface of a first protrusion. That is, a reinforcing protrusion is formed integrally with a first protrusion in a continuous manner. This prevents second moment of area from decreasing at the borders between the first and second rectangular regions. As a result, a bending deformation is less likely to occur at the borders between the first and second rectangular regions. Further, the second rectangular regions include recesses and protrusions. This increases second moment of area in a cross section that crosses the direction in which the reinforcing protrusions extend. Thus, a bending deformation is less likely to occur. That is, second moment of area is large in any cross section, providing a certain flexural rigidity.

In an implementation where the top surface of a reinforcing protrusion does not form one face together with the top surface of a first protrusion, for example, the top surface of the reinforcing protrusion may be located between an imaginary reference plane and the top surface of the first protrusion. Then, the height of the reinforcing protrusion is small. Thus, second moment of area decreases at the borders between the first and second rectangular regions. As a result, a bending deformation can easily occur. In contrast, in the panel described above, the top surface of a reinforcing protrusion forms one face together with the top surface of a first protrusion. This prevents second moment of area from decreasing. As a result, a bending deformation is less likely to occur.

In the panel described above, the first and second rectangular regions are in rows and columns, the first and second rectangular regions in each row being arranged alternately and the first and second rectangular regions in each column being arranged alternately. Thus, the top surfaces of the first protrusions are arranged uniformly in a reinforcing unit. That is, in a reinforcing unit, the flat faces defined by the ridges are disposed uniformly. Thus, when a twisting deformation occurs, an in-plane shear stress can easily be produced uniformly in the entire panel. That is, a certain torsional rigidity is provided.

Preferably, each of the first rectangular regions and the second rectangular regions is square in shape in plan view. In this case, the length of one side of a flat face defined by ridges (more specifically, top surface of the first protrusion) as measured in the row direction is equal to that as measured in the column direction. Thus, substantially the same in-plane shear stress is produced when a twisting deformation occurs about an axis extending in the row direction and when a twisting deformation occurs about an axis extending in the column direction. That is, substantially the same torsional rigidity is produced when a twisting deformation occurs about an axis extending in the row direction and when a twisting deformation occurs about an axis extending in the column direction. In other words, the anisotropy of torsional rigidity can be reduced.

Preferably, the ratio between the number of the first rectangular regions and the number of the second rectangular regions ranges from 4:6 to 6:4. This simultaneously provides a certain flexural rigidity and a certain torsional rigidity. The ratio between the number of the first rectangular regions and the number of the second rectangular regions may be changed within the above range such that, for example, the number of the first rectangular regions is larger than the number of the second rectangular regions when slightly greater importance is attached to torsional rigidity, or, on the contrary, the number of the first rectangular regions is smaller than the number of the second rectangular regions 14B when slightly greater importance is attached to flexural rigidity.

Preferably, a plurality of reinforcing units are provided. The plurality of reinforcing units are arranged in rows and/or columns. For two adjacent reinforcing units, a top surface of a reinforcing protrusion of a second rectangular region included in one reinforcing unit forms one face together with a top surface of a second protrusion of a second rectangular region included in the other reinforcing unit or a top surface of a first protrusion of a first rectangular region included in the other reinforcing unit.

This prevents second moment of area from decreasing at the borders between one reinforcing unit and the other reinforcing unit.

In an implementation where the top surface of the reinforcing protrusion of a second rectangular region included in one reinforcing unit does not form one face together with the top surface of the second protrusion of a second rectangular region included in the other reinforcing unit or the top surface of the first protrusion of a first rectangular region included in the other reinforcing unit, for example, the top surface of the reinforcing protrusion in the one reinforcing unit may be located between an imaginary reference plane and the top surface of the second protrusion or the top surface of the first protrusion in the other reinforcing unit. Then, the height of the reinforcing protrusion is small. Thus, second moment of area decreases at the borders between the one reinforcing unit and the other reinforcing unit. In contrast, in the preferred aspect described above, the top surface of the reinforcing protrusion in the one reinforcing unit forms one face together with the top surface of the second protrusion or the top surface of the first protrusion in the other reinforcing unit. This prevents second moment of area from decreasing at the borders between the one reinforcing unit and the other reinforcing unit.

Embodiments of the present invention will be described below with reference to the drawings. The same or corresponding parts in the drawings are labeled with the same characters and their description will not be repeated.

First Embodiment

A panel 10 in a first embodiment of the present invention will be described with reference to FIG. 1. The panel 10 includes a plurality of reinforcing units. The plurality of reinforcing units include a plurality of reinforcing units 12 and a plurality of reinforcing units 12A. The reinforcing units 12 and 12A are in rows and columns, where the reinforcing units 12 and 12A in each row are arranged alternately and the reinforcing units 12 and 12A in each column are arranged alternately.

Figure 2:
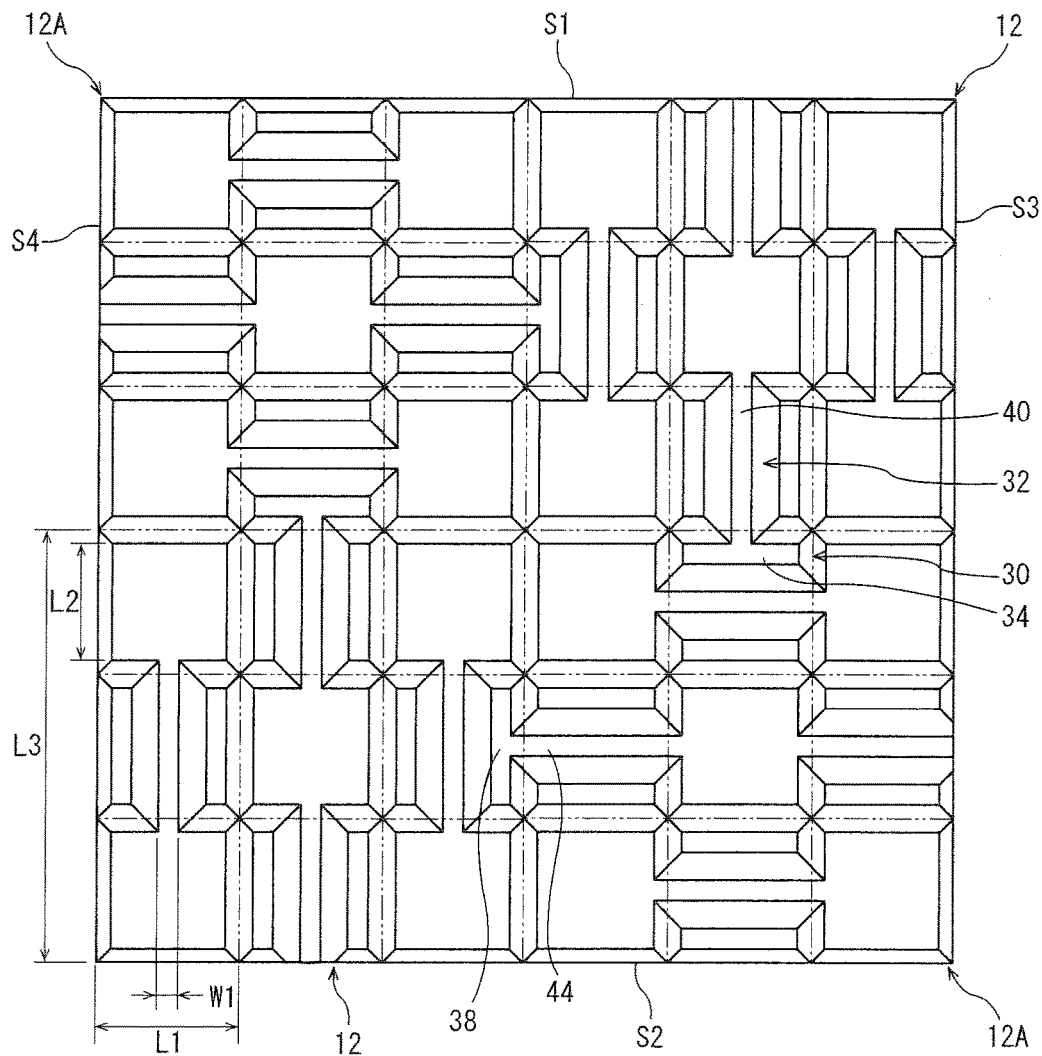
FIG. 2 is an enlarged plan view of some of the plurality of reinforcing units included in the panel shown in FIG. 1.

FIG. 2 is an enlarged view of four of the plurality of reinforcing units included in the panel 10, i.e. reinforcing units 12, 12, 12A and 12A arranged in two rows signal and two columns. The reinforcing units 12 and 12A will be described below.

[Reinforcing Unit 12]

Figure 3:
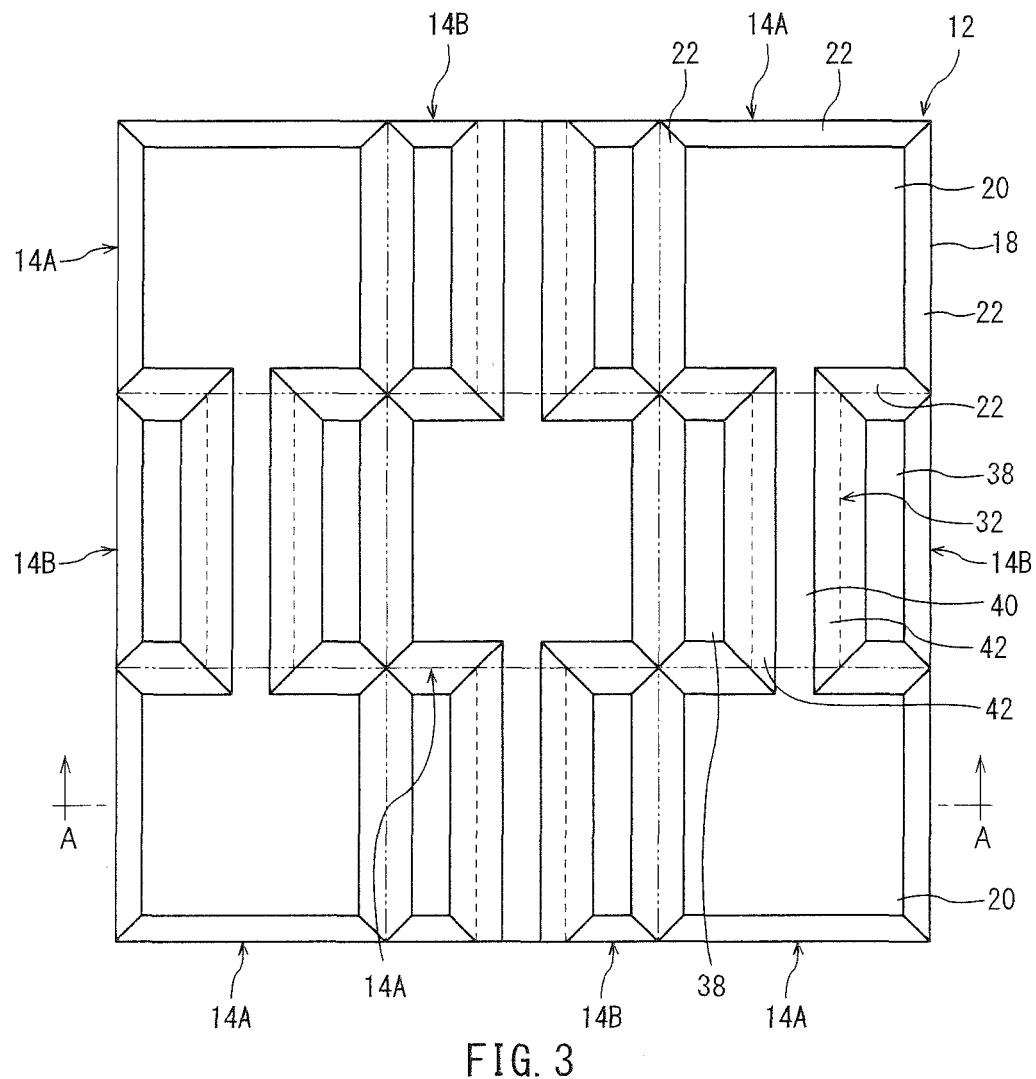
FIG. 3 is a plan view of a reinforcing unit.

As shown in FIG. 3, a reinforcing unit 12 includes a plurality of first rectangular regions 14A and a plurality of second rectangular regions 14B. As shown in FIG. 3, the first and second rectangular regions 14A and 14B are in rows and columns, where the first and second rectangular regions 14A and 14B in each row are arranged alternately and the first and second rectangular regions 14A and 14B in each column are arranged alternately. In the reinforcing unit 12, the first and second rectangular regions 14A and 14B are arranged in three rows and three columns. The reinforcing unit 12 has more first rectangular regions 14A than second rectangular regions 14B.

Row direction as used herein means the direction of a row formed by first and second rectangular regions 14A and 14B, and column direction as used herein means the direction of a column formed by first and second rectangular regions 14A and 14B. The row direction is consistent with the direction of a row of reinforcing units 12 and 12A, and the column direction is consistent with the direction of a row of reinforcing units 12 and 12A.

[First Rectangular Region]

Figure 4:
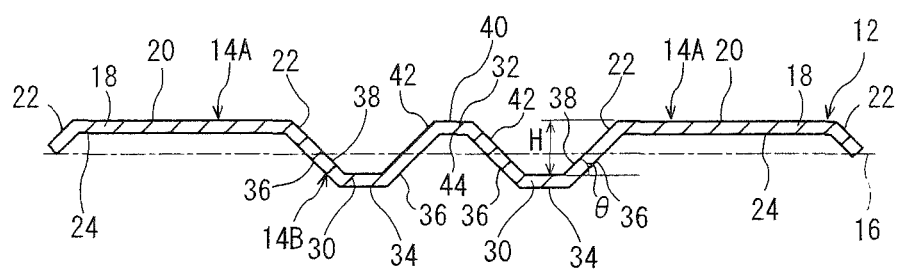
FIG. 4 is a cross-sectional view taken along line A-A of FIG. 3.

A first rectangular region 14A is rectangular in shape in plan view. In the implementation shown in FIG. 3, the first rectangular region 14A is square in shape in plan view. As shown in FIG. 4, the first rectangular region 14A includes a first protrusion 18. As shown in FIG. 4, the first protrusion 18 protrudes in a direction perpendicular to an imaginary reference plane 16 (for example, plane that passes through the center of the panel as measured in the thickness direction as viewed looking at a side of the panel) (hereinafter referred to as front direction). That is, the first protrusion 18 protrudes away from the reference plane 16. The size of a cross section of the first protrusion 18 parallel to the reference plane 16 gradually decreases as it goes away from the reference plane 16.

Figure 5:
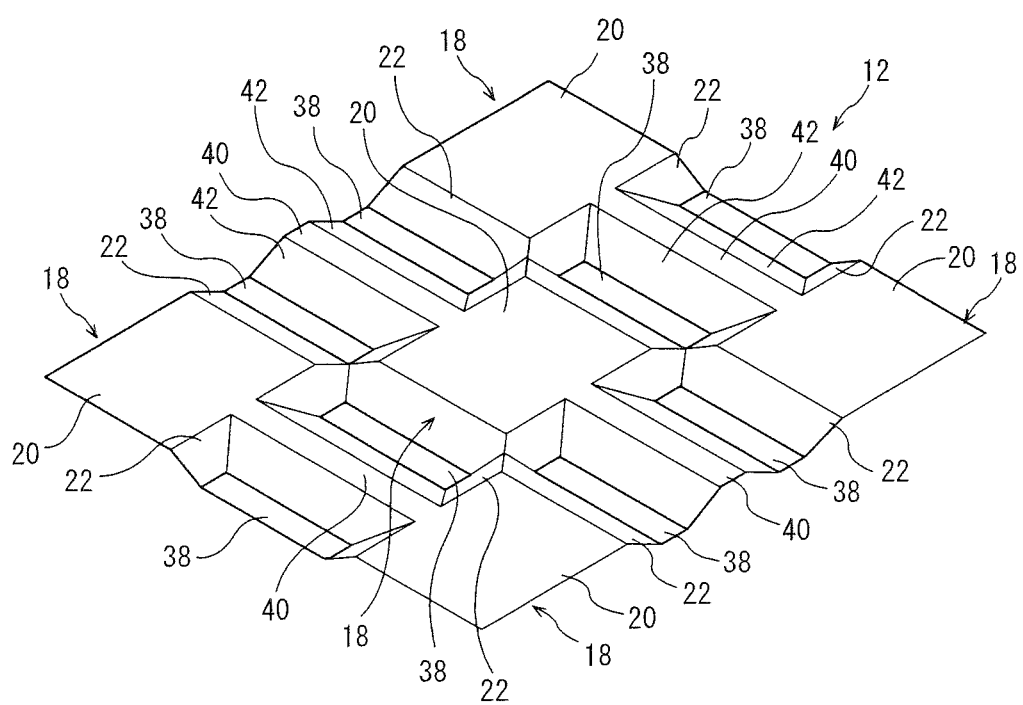
FIG. 5 is a perspective view of the reinforcing unit of FIG. 3.

As shown in FIGS. 3 to 5, the first protrusion 18 includes a top surface 20 and four sides 22.

The top surface 20 is parallel to the reference plane 16. The top surface 20 is square in shape in plan view.

Each side 22 is connected with the top surface 20. Each side 22 is connected with the sides 22 located around the top surface 20 and adjacent to itself.

Each side 22 is inclined relative to the reference plane 16. As the inclination θ of the side 22 relative to the reference plane 16 increases, the rigidity is improved but localized decrease in plate thickness or cracking may easily occur during molding. One may decide on an inclination θ of the side 22 relative to the reference plane 16 taking into consideration how much rigidity is to be improved, how easily the material can be molded and other factors. When the material is steel, the inclination θ is preferably in the range of 15 to 60 degrees, and more preferably 45 degrees.

As shown in FIG. 4, the first rectangular region 14A further includes a recess 24. The recess corresponds to the first protrusion 18 and is open toward the back direction, which is opposite to the front direction.

[Second Rectangular Region]

A second rectangular region 14B is rectangular in shape in plan view. In the implementation shown in FIG. 3, the second rectangular region 14B is square in shape in plan view. The shape and size of the second rectangular region 14B in plan view are the same as those of the first rectangular region 14A. As shown in FIG. 4, the second rectangular region 14B includes a pair of second protrusions 30 and a reinforcing protrusion 32.

As shown in FIG. 4, the second protrusions 30 protrude in the back direction. That is, the second protrusions 30 protrude away from the reference plane 16. The size of a cross section of each of the second protrusions 30 parallel to the reference plane 16 gradually decreases as it goes away from the reference plane 16.

As shown in FIGS. 3 to 5, each second protrusion 30 includes a top surface 34 and sides 36. Although not clear in FIGS. 3 to 5, there are four sides 36.

The top surface 34 is parallel to the reference plane 16. The top surface 34 is in the shape of a rectangle that extends in the column direction in plan value. The top surface 34 is smaller than the top surface 20.

Each side 36 is connected with the top surface 34. Each side 36 is connected with the sides 36 located around the top surface 34 and adjacent to itself.

Each side 36 is inclined relative to the reference plane 16. The inclination of the side 36 relative to the reference plane 16 is equal to the inclination of the sides 22 relative to the reference plane 16.

The second rectangular region 14B further includes recesses 38. The recesses 38 correspond to the second protrusions 30 and are open toward the front direction.

As shown in FIG. 4, the reinforcing protrusion 32 protrudes in the front direction. That is, the reinforcing protrusion 32 protrudes away from the reference plane 16. The size of a cross section of the reinforcing protrusion 32 parallel to the reference plane 16 gradually decreases as it goes away from the reference plane 16. The reinforcing protrusion 32 is located between the two of the four sides of the second rectangular region 14B that extend in the column direction. That is, the reinforcing protrusion 32 extends in the column direction and is located between the pair of second protrusions 30 in plan view.

As shown in FIGS. 3 to 5, the reinforcing protrusion 32 includes a top surface 40 and a pair of sides 42.

The top surface 40 is parallel to the reference plane 16. The top surface 40 is in the shape of a rectangle that extends in the column direction in plan view. The top surface 40 is formed in a continuous manner with the top surface 20 of a first protrusion 18. That is, the distance between the top surface 40 and reference plane 16 is equal to the distance between the top surface 20 and reference plane 16.

Each side 42 is connected with the top surface 40. Each side 42 is connected with a side 22 of the first protrusion 18 of a first rectangular region 14A located adjacent in the column direction. Each side 42 is formed in a continuous manner with a side of a recess 38.

Each side 42 is inclined relative to the reference plane 16. The inclination of the side 42 relative to the reference plane 16 is equal to the inclination of the sides 22 relative to the reference plane 16.

The second rectangular region 14B further includes a recess groove 44. The recess groove 44 corresponds to the reinforcing protrusion 32 and is open toward the back direction. The recess groove 44 is connected with the recess 24 of an adjacent first rectangular region 14A. That is, the bottom surface of the recess groove 44 is formed in a continuous manner with the bottom surface of the recess 24. The sides of the recess groove 44 is formed in a continuous manner with sides 36 of the second protrusions 30.

[Reinforcing Unit 12A]

Figure 6:
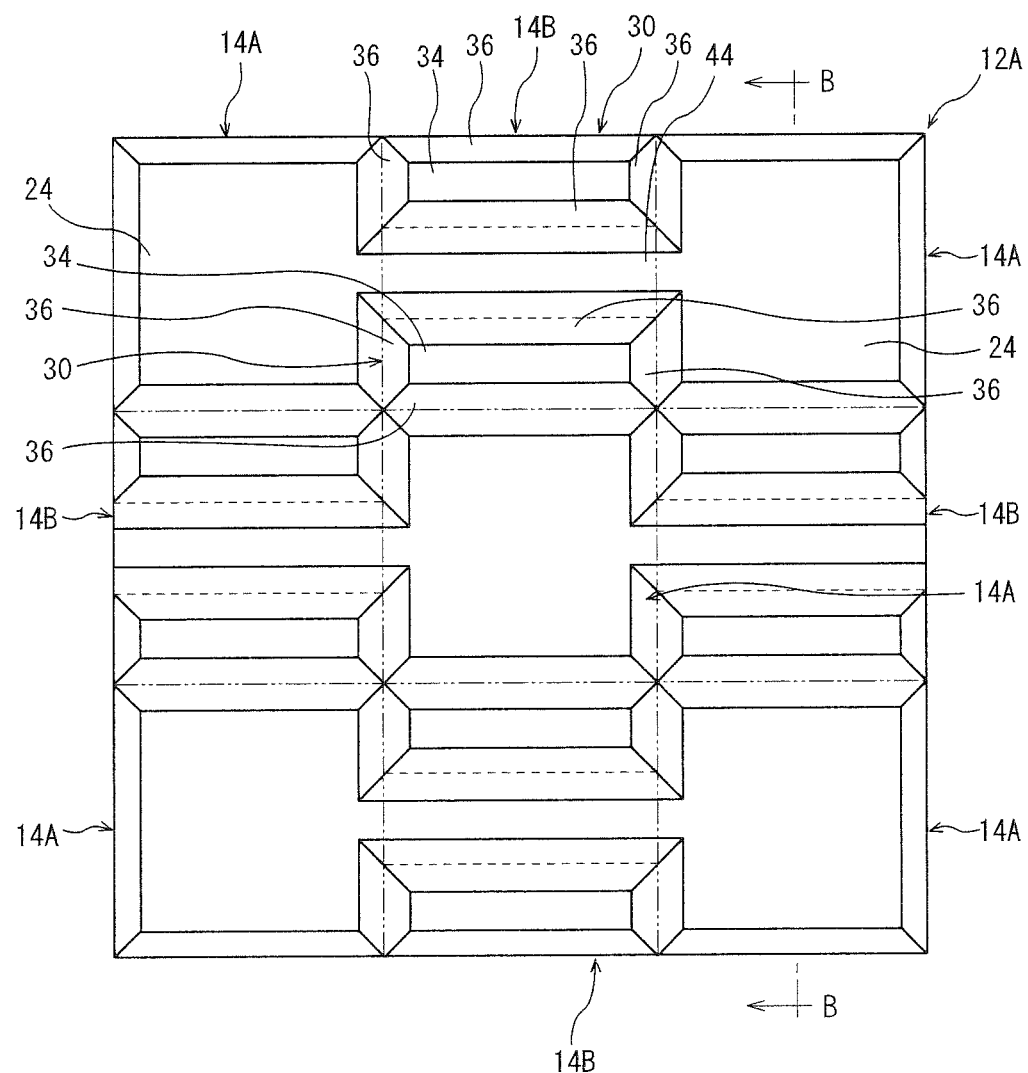
FIG. 6 is a plan view of a reinforcing unit.
Figure 7:
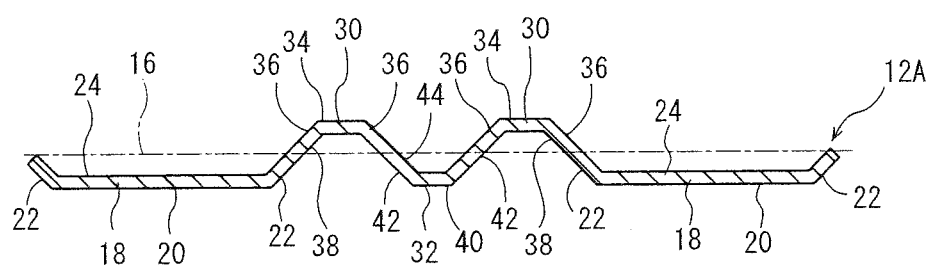
FIG. 7 is a cross-sectional view taken along line B-B of FIG. 6.

A reinforcing unit 12A is obtained by turning a reinforcing unit 12 over and rotating it by 90 degrees. In the reinforcing unit 12A, as shown in FIGS. 6 and 7, the first protrusions 18 and reinforcing protrusions 32 protrude in the back direction and the second protrusions 30 protrude in the front direction. In the reinforcing unit 12A, the reinforcing protrusions 32 extend in the row direction.

As shown in FIG. 2, the top surface 40 of the reinforcing protrusion 32 of a second rectangular region 14B in a reinforcing unit 12 is formed in a continuous manner with the top surface 34 of a second protrusion 30 of a second rectangular region 14B in a reinforcing unit 12A. Further, the bottom surface of the recess groove 44 of a second rectangular region 14B in a reinforcing unit 12A is formed in a continuous manner with the bottom surface of a recess 38 of a second rectangular region 14B in a reinforcing unit 12. That is, although not shown, the top surface 40 of the reinforcing protrusion 32 of a second rectangular region 14B in a reinforcing unit 12A is formed in a continuous manner with the top surface 34 of a second protrusion 30 of a second rectangular region 14B in a reinforcing unit 12.

The panel 10 includes a plurality of reinforcing units 12 and 12A. This simultaneously provides a certain flexural rigidity and a certain torsional rigidity. The reasons will be provided below.

Figure 8:
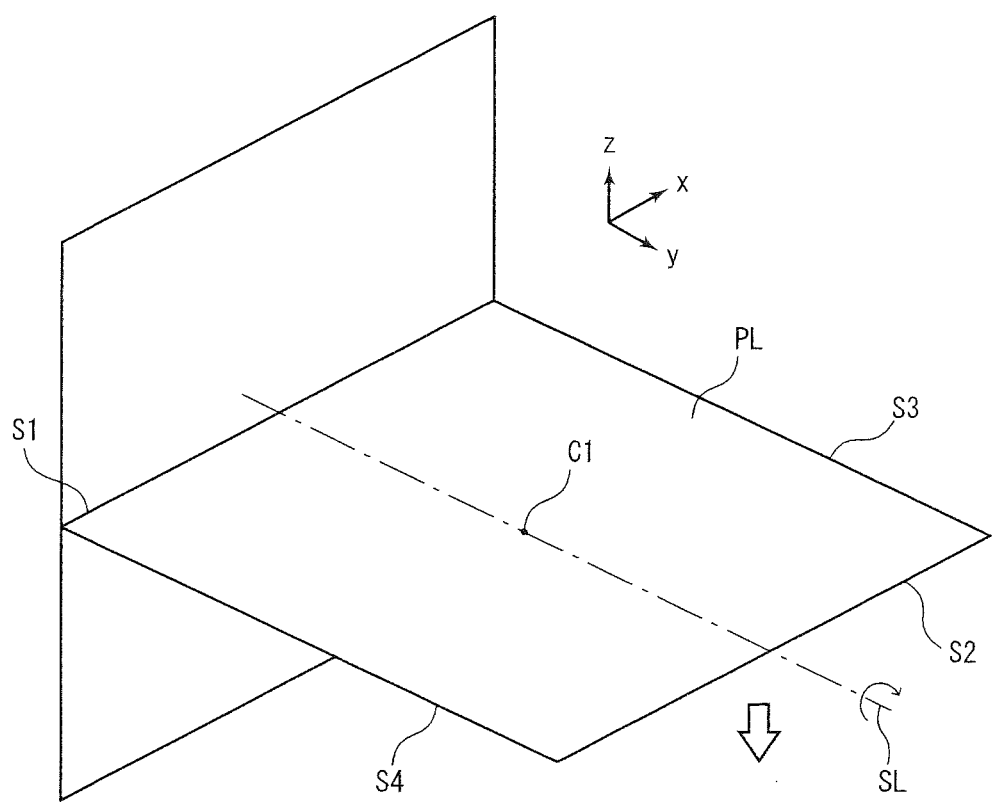
FIG. 8 is a perspective view of a panel illustrating flexural rigidity and torsional rigidity.

First, flexural rigidity and torsional rigidity will be discussed with reference to FIG. 8. Referring to FIG. 8, a panel PL has four sides S1 to S4. Two of the four sides S1 to S4, S1 and S2, extend in the X-direction. The two sides S3 and S4 extend in the Y-direction. The X-direction corresponds to the row direction and the Y-direction corresponds to the column direction. FIG. 8 shows the panel PL with the side S1 fixed. Flexural rigidity means the difficulty of the panel PL being deformed when a displacement in the Z-direction (i.e. displacement in a bending direction) is caused in the side S2 of the panel PL, which is parallel to the side S1. Torsional rigidity means the difficulty of the panel PL being deformed when a displacement about a reference line SL extending in the Y-direction (i.e. displacement in a twisting direction is caused). The reference line SL passes through the center C1 of the panel PL and is perpendicular to the sides S1 and S2.

Figure 9A:
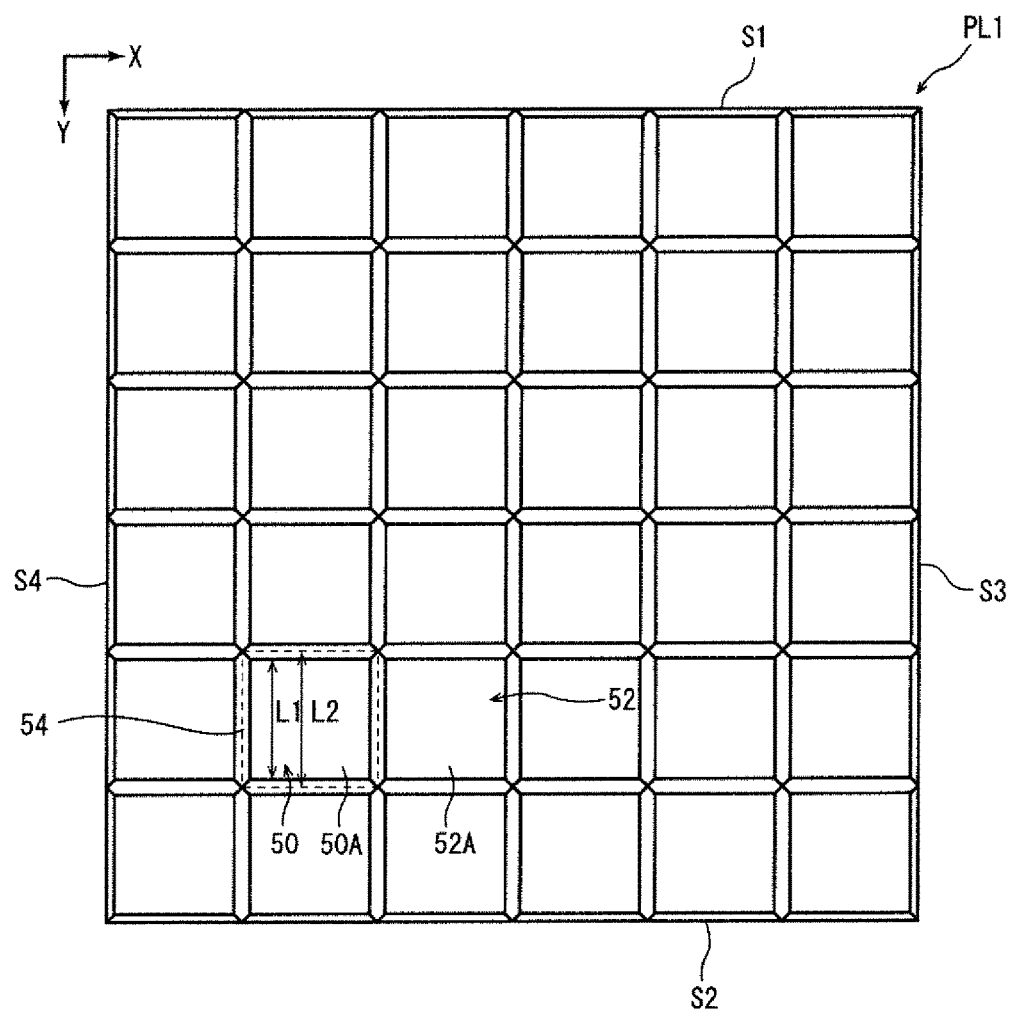
FIG. 9A is a plan view of a panel of Comparative Example 1.
Figure 9B:
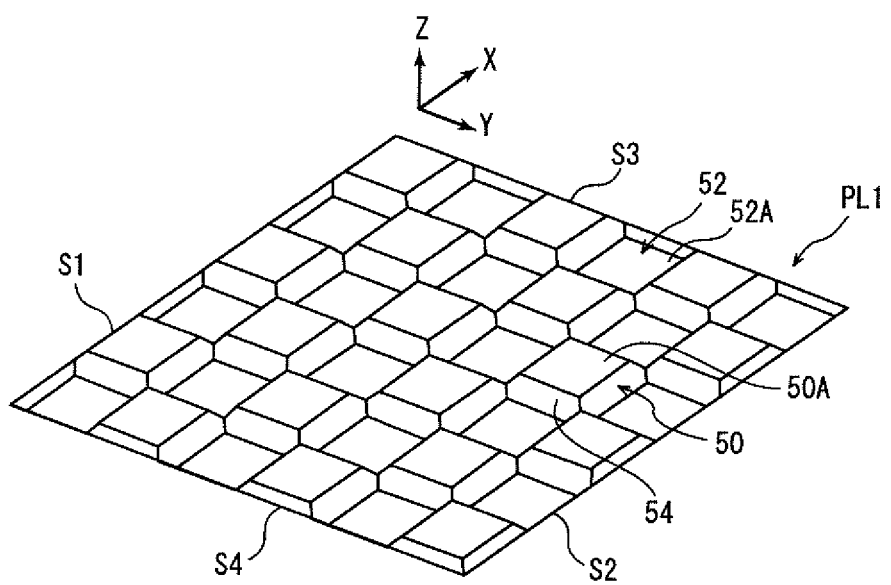
FIG. 9B is a perspective view of the panel of Comparative Example 1.

Referring to FIGS. 9A and 9B, a panel PL1 having reinforcing portions such as those shown in these figures will be described. The sides S1 to S4 shown in FIGS. 9A and 9B correspond to the sides S1 to S4 shown in FIG. 8.

In the panel PL1, protrusions 50 each having a top surface 50A and recesses 52 each having a bottom surface 52A are in rows and columns, where such protrusions and recesses in each row are arranged alternately and such protrusions and recesses in each column are arranged alternately. Each of the top surfaces 50A and bottom surfaces 52A is square in shape in plan view, and they are connected by sides 54.

It is assumed that a displacement in a twisting direction is caused in the panel PL1 with the side S1 fixed, similar to the panel of FIG. 8. In the panel PL1, the top surfaces 50A and bottom surfaces 52A are arranged in a grid and share ridges located at the borders between the recesses and protrusions. Thus, when a displacement in a twisting direction occurs, the load propagates throughout the panel through the shared ridges and an in-plane shear stress is produced in the top surfaces 50A and bottom surfaces 52A. That is, when a displacement in a twisting direction occurs, an in-plane shear stress can be produced uniformly in the entire panel PL1. Thus, the panel PL1 has high torsional rigidity.

Figure 10A:
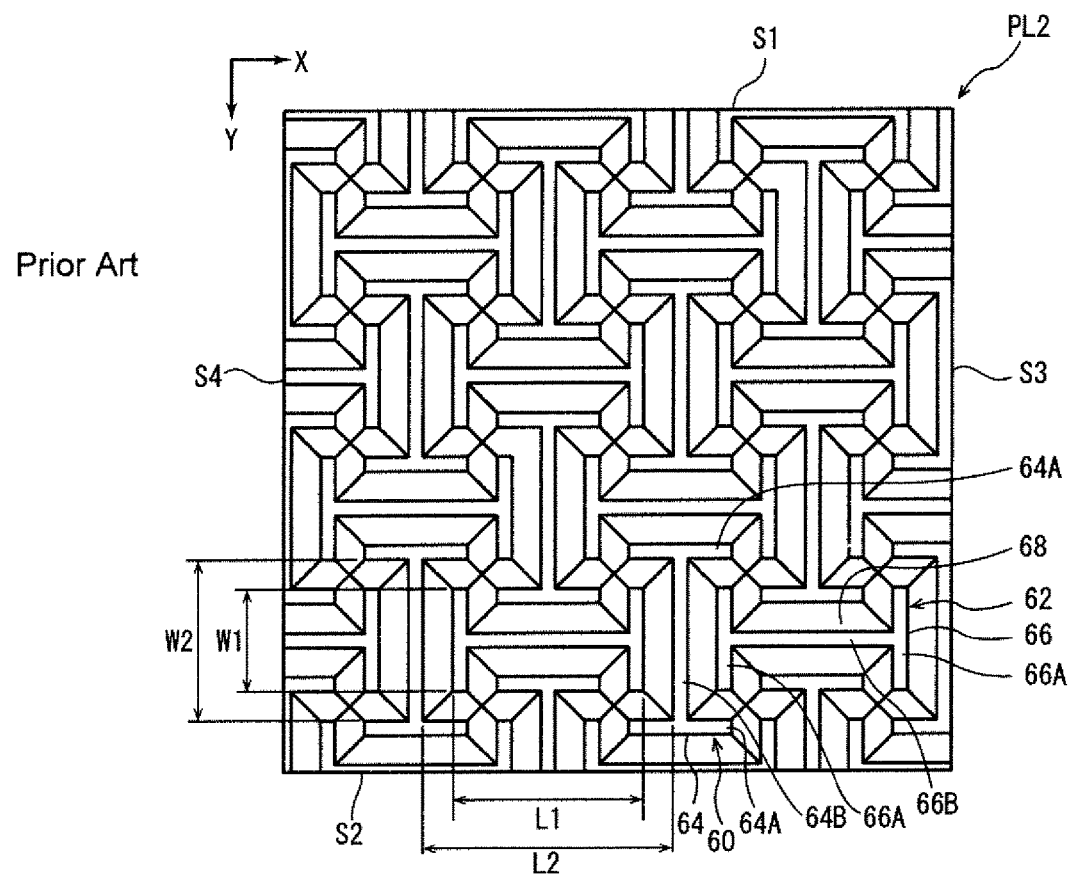
FIG. 10A is a plan view of a panel of Comparative Example 2.
Figure 10B:
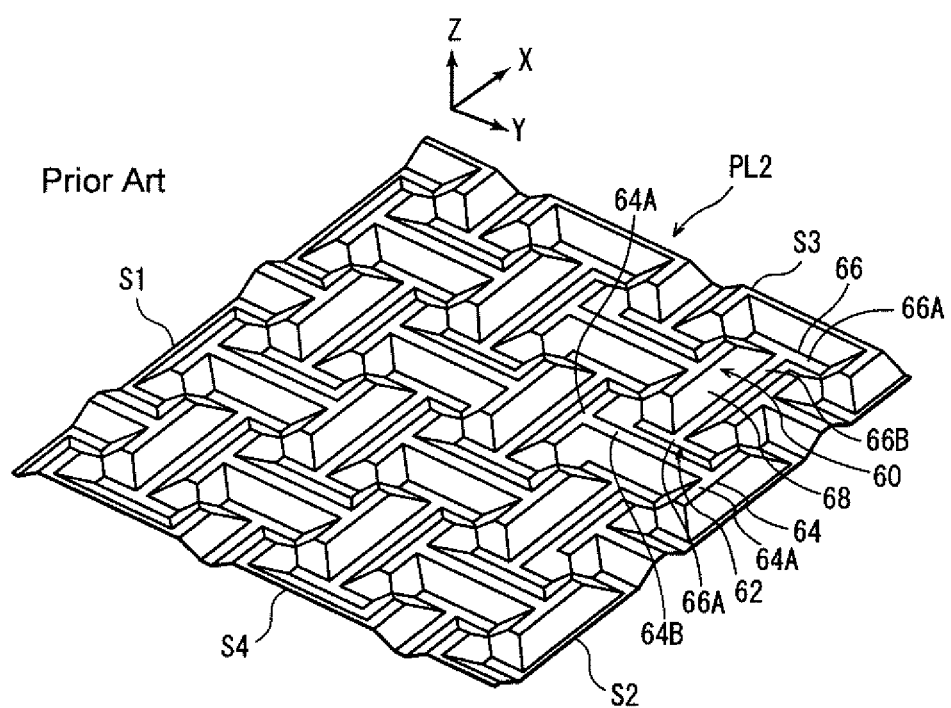
FIG. 10B is a perspective view of the panel of Comparative Example 2.

Referring to FIGS. 10A and 10B, a panel PL2 having reinforcing portions such as those shown in these figures will be described. The sides S1 to S4 shown in FIGS. 10A and 10B correspond to the sides S1 to S4 shown in FIG. 8.

In the panel PL2, protrusions 60 each having a top surface 64 and recesses 62 each having a bottom surface 66 are in rows and columns, where such protrusions and recesses in each row are arranged alternately and such protrusions and recesses in each column are arranged alternately. Each top surface 64 includes a pair of extending portions 64A and a connecting portion 64B connecting them. Each bottom surface 66 includes a pair of extending portions 66A and a connecting portion 66B connecting them. The top surfaces 64 and bottom surfaces 66 are connected by sides 68.

It is assumed that, similar to the situation of FIG. 8, a displacement in a bending direction is caused in the panel PL2 with the side S1 fixed. In the panel PL2, the second moment of area in the XZ-plane perpendicular to the Y-direction can be prevented from decreasing at any position in the Y-direction. This provides a certain flexural rigidity.

As discussed above, the panel PL1 has high torsional rigidity, while the panel PL2 has high flexural rigidity. However, the panels PL1 and PL2 suffer from the following problems.

The panel PL1 has shallow square recesses/protrusions such that second moment of area is small, particularly at the borders between the protrusions 50 and recesses 52. Thus, when a displacement in a bending direction occurs, a bending deformation may occur, particularly at the borders between the protrusions 50 and recesses 52. That is, the panel PL1 has characteristics that are particularly advantageous in terms of torsional rigidity, and has a flexural rigidity that is much lower than its torsional rigidity.

In the panel PL2, it is difficult to provide a large area for each of the top and bottom surfaces 64 and 66. Thus, when a displacement in a twisting direction occurs, in-plane shear stress is unlikely to be produced uniformly in the entire panel PL2. As a result, a twisting deformation can occur. That is, the panel PL2 has characteristics that are particularly advantageous in terms of flexural rigidity, and has a torsional rigidity that is much lower than its flexural rigidity.

In contrast, in the panel 10, in every one of the plurality of reinforcing units 12 and 12A, first and second rectangular regions 14A and 14B are in rows and columns, where the first and second rectangular regions 14A and 14B in each row are arranged alternately and first and the first and second rectangular regions 14A and 14B in each column are arranged alternately. That is, in every one of the plurality of reinforcing units 12 and 12A, the top surfaces 20 are arranged uniformly. Thus, flat faces defined by ridges are present uniformly in all the reinforcing units 12 and 12A. As a result, when a twisting deformation occurs, in-plane shear stress can easily be produced uniformly in the entire panel 10. That is, a certain torsional rigidity is provided.

In the panel 10, a top surface 40 forms one face together with a top surface 20 in all the reinforcing units 12 and 12A. Thus, in all the reinforcing units 12, second moment of area can be prevented from decreasing at the borders, in the column direction, between the first and second rectangular regions 14A and 14B. As a result, in all the reinforcing units 12, a bending deformation is unlikely to occur at the borders, in the column direction, between the first and second rectangular regions 14A and 14B. Further, in all the reinforcing units 12A, second moment of area can be prevented from decreasing at the borders, in the row direction, between the first and second rectangular regions 14A and 14B. As a result, in all the reinforcing units 12A, a bending deformation is unlikely to occur at the borders, in the row direction, between the first and second rectangular regions 14A and 14B. In addition, in all the reinforcing units 12 and 12A, the second rectangular regions 14B have recesses and protrusions. Thus, second moment of area in a cross section that crosses the direction in which the reinforcing protrusions 32 extend is large. As a result, a bending deformation is unlikely to occur. That is, second moment of area is large in any cross section. As such, a certain flexural rigidity can be provided.

In the panel 10, the top surface 40 of the reinforcing protrusion 32 of a second rectangular region 14B in a reinforcing unit 12 is formed in a continuous manner with the top surface 34 of a second protrusion 30 of a second rectangular region 14B in a reinforcing unit 12A. Further, the top surface 40 of the reinforcing protrusion 32 of a second rectangular region 14B in a reinforcing unit 12A is formed in a continuous manner with the top surface 34 of a second protrusion 30 of a second rectangular region 14B in a reinforcing unit 12. This prevents second moment of area from decreasing at the borders between the reinforcing units 12 and 12A. As a result, a bending deformation is unlikely to occur at the borders between the reinforcing units 12 and 12A.

In the panel 10, in every one of the reinforcing units 12 and 12A, the ratio of the number of first rectangular regions 14A and the number of second rectangular regions 14B is 5:4. That is, in the present embodiment, in every one of the reinforcing units 12 and 12A, the number of first rectangular regions 14A and the number of second rectangular regions 14B are substantially equal, or more particularly, the ratio of these numbers is in the range of 4:6 to 6:4. This simultaneously provides a certain flexural rigidity and a certain torsional rigidity.

In the panel 10, in all the reinforcing units 12 and 12A, the first and second rectangular regions 14A and 14B are square in shape in plan view. In this case, the length of one side of a flat face defined by ridges (more specifically, top surface 20) as measured in the row direction is equal to that as measured in the column direction. Thus, substantially the same in-plane shear stress is produced when a twisting deformation occurs about an axis extending in the row direction and when a twisting deformation occurs about an axis extending in the column direction. That is, substantially the same torsional rigidity is produced when a twisting deformation occurs about an axis extending in the row direction and when a twisting deformation occurs about an axis extending in the column direction. In short, the present embodiment can reduce the anisotropy of torsional rigidity.

The flexural rigidity and torsional rigidity of a panel having reinforcing portions as shown in FIG. 2 (hereinafter referred to as panel 10 of the Inventive Example) were evaluated using FEM analysis. For comparison, FEM analysis was similarly conducted for a panel having reinforcing portions as shown in FIGS. 9A and 9B (hereinafter referred to as panel PL1 of Comparative Example 1) and a panel having reinforcing portions as shown in FIGS. 10A and 10B (hereinafter referred to as panel PL2 of Comparative Example 2).

[Conditions for FEM Analysis]

For FEM analysis, a commercially available, general-purpose program code LS-DYNA ver. 971 was used. The element type was complete integral shell element. The element size was a square with a side 1 mm long. To evaluate rigidity, the static implicit method for solving a balance equation of forces was selected for use. The panel was made of a material corresponding to JAC270D. The Young's modulus was 206 GPa. The Poisson's rate was 0.30. The 0.2% yield strength was 183 MPa. The tensile strength was 308 MPa. The n value was 0.20. The panel had shaped as a square with a side 470 mm long. The thickness of the panel was 0.6 mm.

[Panel of Inventive Example]

Referring to FIG. 2, in the panel of the Inventive Example, a first rectangular region 14A had a side with a length (L1 in FIG. 2) of 50 mm. A top surface 20 had a side with a length (L2 in FIG. 2) of 42.5 mm. A reinforcing unit had a side with a length (L3 in FIG. 2) of 150 mm. A top surface 40 had a width (W1 in FIG. 2) of 5 mm. The recess/protrusion depth (H in FIG. 4) was 5 mm.

[Panel of Comparative Example 1]

In the panel PL1 of Comparative Example 1, the recess/protrusion depth was 3 mm. A top surface 50A had a side with a length (L1 in FIG. 9A) of 27 mm. A protrusion 50 had a side with a length (L2 in FIG. 9A) of 30 mm.

[Panel of Comparative Example 2]

In the panel PL2 of Comparative Example 2, the recess/protrusion depth was 3 mm. A bottom surface 66 had a length as measured in the row direction (L1 in FIG. 10A) of 35 mm. The distance between the connecting portions 64B of the protrusion 60 located adjacent to a recess 62 in the row direction (L2 in FIG. 10A) was 45 mm. The length of an extending portion 66A of a recess 62 as measured in the column direction (W1 in FIG. 10A) was 19 mm. The length of the connecting portion 64B of a protrusion 60 (W2 in FIG. 10A) was 29 mm.

[Arrangements of Top and Bottom Surfaces]

Figure 11:
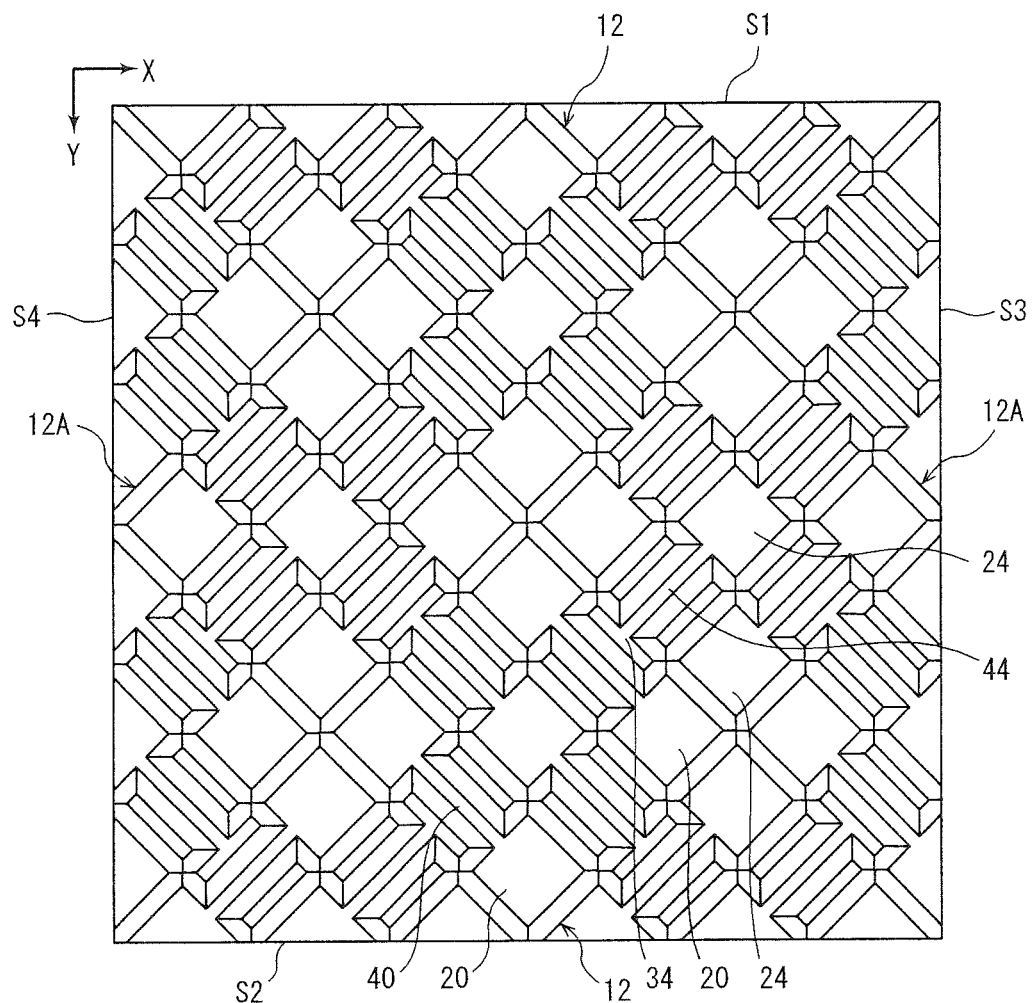
FIG. 11 is a plan view of the panel of the Inventive Example with the top surfaces and bottom surfaces arranged diagonally.
Figure 12:
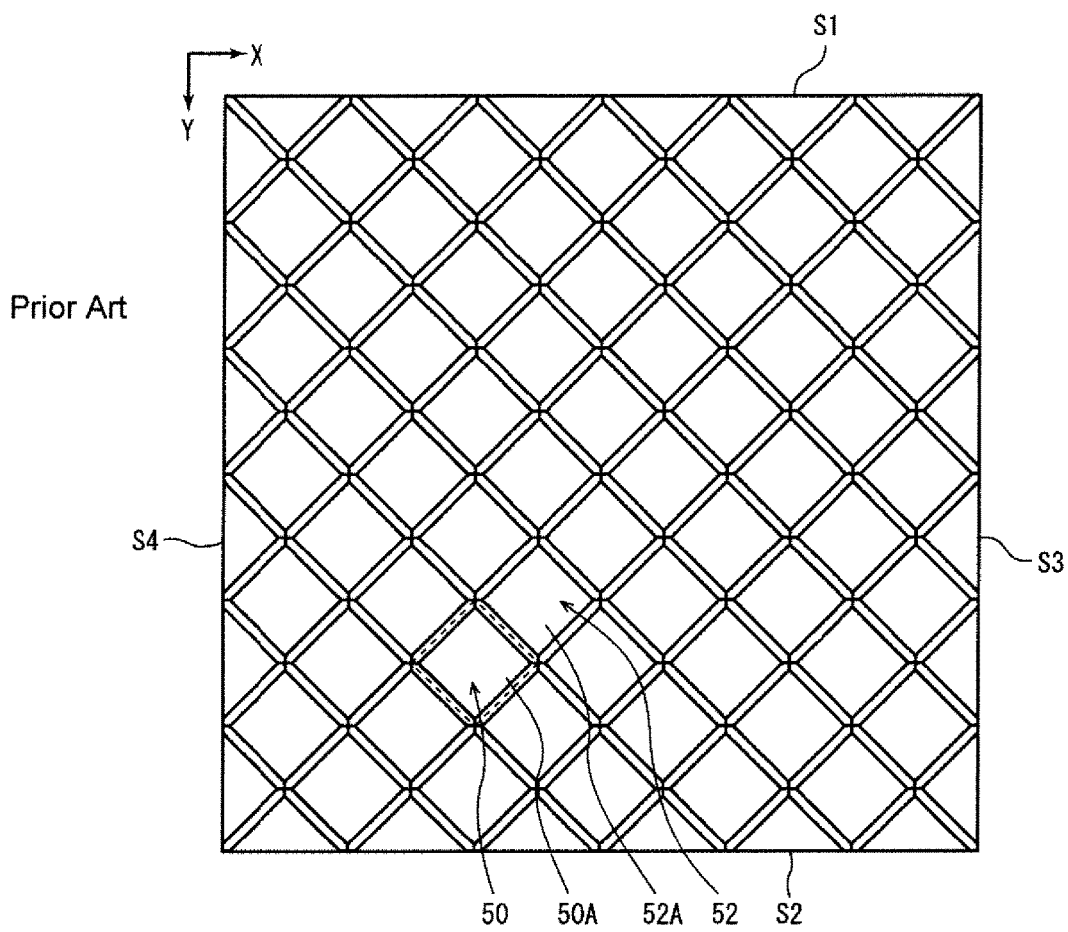
FIG. 12 is a plan view of the panel of Comparative Example 1 with the top surfaces and bottom surfaces arranged diagonally.
Figure 13:
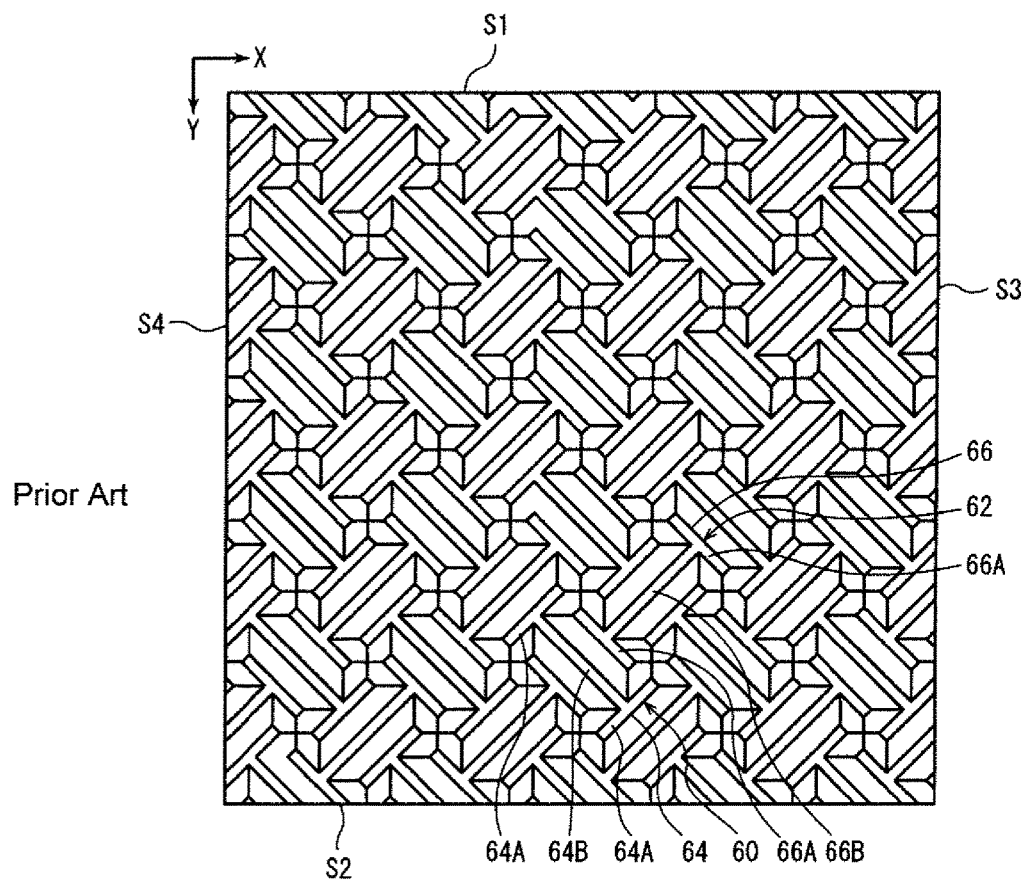
FIG. 13 is a plan view of the panel of Comparative Example 2 with the top surfaces and bottom surfaces arranged diagonally.

Flexural rigidity and torsional rigidity were evaluated for a standard arrangement and a diagonal arrangement of top and bottom surfaces. Top and bottom surfaces arranged in a standard manner (hereinafter referred to as standard arrangement) are shown in FIGS. 2, 9A and 10A. Top and bottom surfaces arranged diagonally (hereinafter referred to as diagonal arrangement) are shown in FIGS. 11, 12 and 13. That is, the direction in which the protrusions and recesses are arranged in the diagonal arrangement is rotated by 45 degrees from that for the standard arrangement.

[Method of Evaluating Flexural Rigidity]

Flexural rigidity was evaluated by using a load-displacement curve obtained when one side of each panel (i.e. side S1 shown in FIGS. 2, 9A, 10A, 11, 12 and 13) was fixed and a load of 1 N was applied to the side parallel to the one side (i.e. side S2 shown in FIGS. 2, 9A, 10A, 11, 12 and 13).

[Method of Evaluating Torsional Rigidity]

Torsional rigidity was evaluated by using a load-displacement curve obtained when one side of each panel (i.e. side S1 shown in FIGS. 2, 9A, 10A, 11, 12 and 13) was fixed and one twisting deformation was caused in a side perpendicular to the one side (i.e. side S3 shown in FIGS. 2, 9A, 10A, 11, 12 and 13).

[Results from FEM Analysis]

Figure 14:
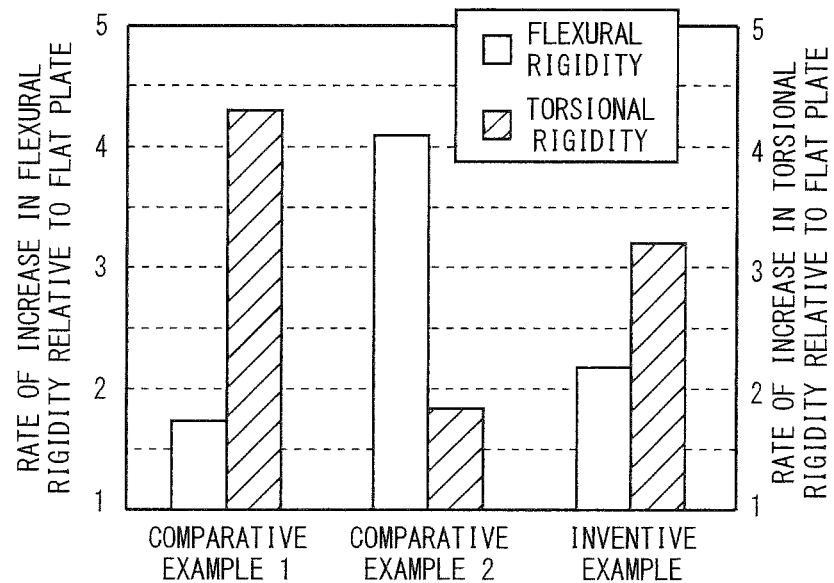
FIG. 14 is a graph showing the results of simulations of flexural rigidity and torsional rigidity with the top surfaces and bottom surfaces arranged in a standard manner.
Figure 15:
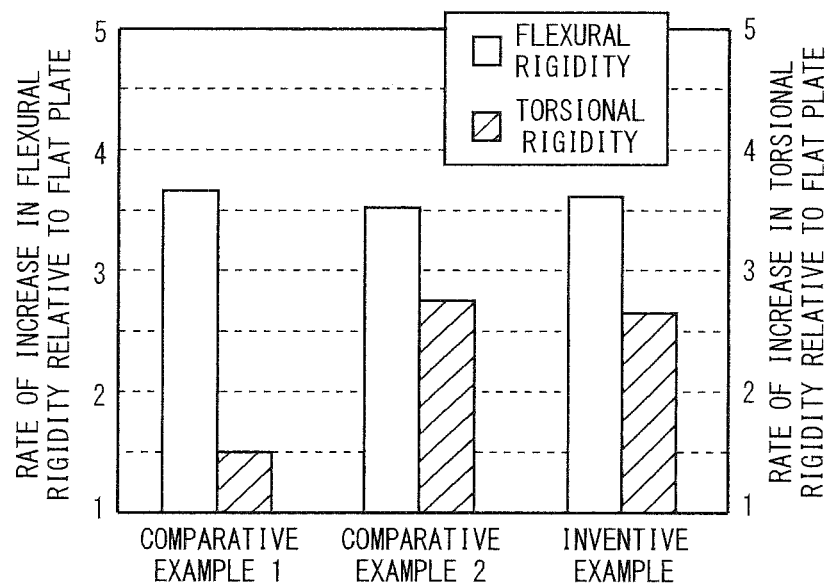
FIG. 15 is a graph showing the results of simulations of flexural rigidity and torsional rigidity with the top surfaces and bottom surfaces arranged diagonally.

FIG. 14 is a graph showing values of flexural rigidity and torsional rigidity from FEM analysis in the standard arrangement. FIG. 15 is a graph showing values of flexural rigidity and torsional rigidity from FEM analysis in the diagonal arrangement. In these graphs, the value N of the rate of increase in flexural rigidity relative to a flat plate indicates that the panel has a flexural rigidity N times that of a flat plate, and the value M of the rate of increase in torsional rigidity relative to a flat plate indicates that the panel has a torsional rigidity M times that of a flat plate.

As shown in FIG. 14, for the panel PL1 of Comparative Example 1, the torsional rigidity was higher than the flexural rigidity and the torsional rigidity was far higher than that of a flat plate. That is, the panel PL1 of Comparative Example 1 had characteristics particularly advantageous in terms of torsional rigidity.

For the panel PL2 of Comparative Example 2, the flexural rigidity was higher than the torsional rigidity and the flexural rigidity was far higher than that of a flat plate. That is, the panel PL2 of Comparative Example 2 had characteristics particularly advantageous in terms of flexural rigidity.

For the panel 10 of the Inventive Example, the torsional rigidity was lower than that of the panel PL1 of Comparative Example 1, but the flexural rigidity was higher. For the panel 10 of the Inventive Example, the flexural rigidity was lower than that of the panel PL2 of Comparative Example 2, but the torsional rigidity was higher. For the panel 10 of the Inventive Example, the difference between the improvement in torsional rigidity over a flat plate and the improvement in flexural rigidity over a flat plate was smaller than those for the panels PL1 and PL2 of Comparative Examples 1 and 2.

As shown in FIG. 15, for the panel PL1 of Comparative Example 1, the flexural rigidity was higher than the torsional rigidity and the difference between them was quite large. That is, the panel PL1 of Comparative Example 1, when in the diagonal arrangement, had characteristics particularly advantageous in terms of flexural rigidity. In other words, the panel PL1 of Comparative Example 1 had characteristics particularly advantageous in terms of flexural rigidity or torsional rigidity depending on whether it was in the standard arrangement or in the diagonal arrangement. In short, for the panel PL1 of Comparative Example 1, a significant difference in flexural rigidity and torsional rigidity was produced by the relationship between the direction in which the protrusions 50 and recesses 52 were arranged and the bending or twisting direction for deformation.

For the panel PL2 of Comparative Example 2, the flexural rigidity was higher than the torsional rigidity not only when the panel was in the standard arrangement but also when it was in the diagonal arrangement. For the panel PL2 of Comparative Example 2, the difference between the torsional rigidity and flexural rigidity was much smaller than that for the standard arrangement. That is, for the panel PL2 of Comparative Example 2, a significant difference in torsional rigidity was produced by the relationship between the direction in which the protrusions 60 and recesses 62 were arranged and the bending or twisting direction for deformation.

For the panel 10 of the Inventive Example, the flexural rigidity was higher than the torsional rigidity when the panel was in the diagonal arrangement. That is, the panel 10 of the Inventive Example had characteristics particularly advantageous in terms of flexural rigidity or torsional rigidity depending on whether it was in the standard arrangement or in the diagonal arrangement. The difference between the flexural rigidity and torsional rigidity for the standard arrangement was substantially equal to that for the diagonal arrangement. That is, for the panel 10 of the Inventive Example, the difference between the flexural rigidity and torsional rigidity was small regardless of the relationship between the direction in which the first and second rectangular regions 14A and 14B were arranged and the bending or twisting direction for deformation.

As can be apparent from the above discussion, the panel 10 of the Inventive Example simultaneously provided a certain torsional rigidity and a certain flexural rigidity regardless of the relationship between the direction in which the protrusions and recesses were arranged and the bending or twisting direction for bending as compared with the panels PL1 and PL2 of Comparative Examples 1 and 2.

Figure 16:
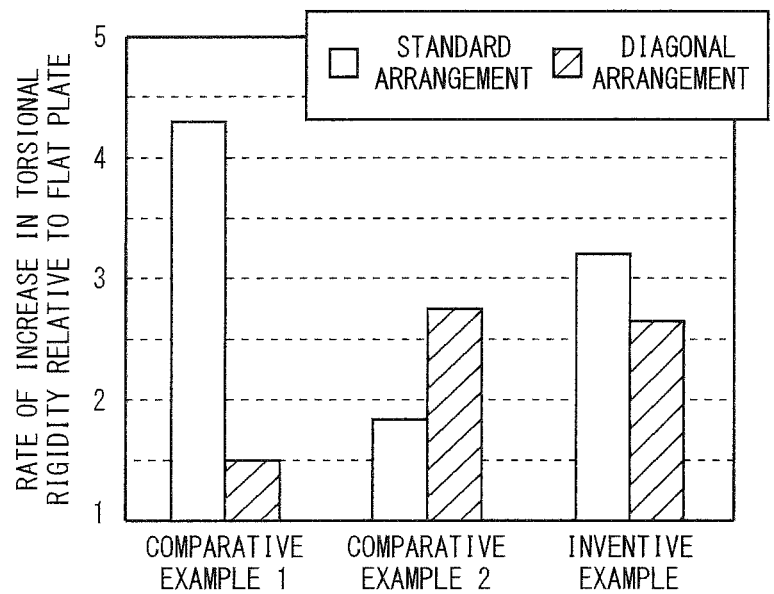
FIG. 16 is a graph showing the results of simulations of torsional rigidity with the top surfaces and bottom surfaces arranged in a standard manner and diagonally.

FIG. 16 is a graph showing values of torsional rigidity from FEM analysis for the standard arrangement and values of torsional rigidity from FEM analysis for the diagonal arrangement. In this graph, the value M of the rate of increase in torsional rigidity relative to a flat plate indicates that the panel has a torsional rigidity M times that of a flat plate.

As shown in FIG. 16, for the panel PL1 of Comparative Example 1, the torsional rigidity for the standard arrangement was much higher than that for the diagonal arrangement. That is, torsional rigidity differed significantly depending on whether the panel was in the standard arrangement or in the diagonal arrangement.

For the panel PL2 of Comparative Example 2, the torsional rigidity for the diagonal arrangement was higher than that for the standard arrangement.

For the panel 10 of the Inventive Example, the torsional rigidity for the standard arrangement was higher than that for the diagonal arrangement. The panel 10 of the Inventive Example had a higher torsional rigidity when in the diagonal arrangement than that of the panel PL1 of Comparative Example 1. The panel 10 of the Inventive Example had a higher torsional rigidity when in the standard arrangement than that of the panel PL2 of Comparative Example 2. It had a substantially equal torsional rigidity when in the diagonal arrangement. For the panel 10 of the Inventive Example, the difference between the torsional rigidity for the standard arrangement and the torsional rigidity for the diagonal arrangement was smaller than those for the panels PL1 and PL2 of Comparative Examples 1 and 2.

As can be apparent from the above discussion, the panel 10 of the Inventive Example had reduced anisotropy in torsional rigidity compared with the panels PL1 and PL2 of Comparative Examples 1 and 2.

Second Embodiment

Figure 17:
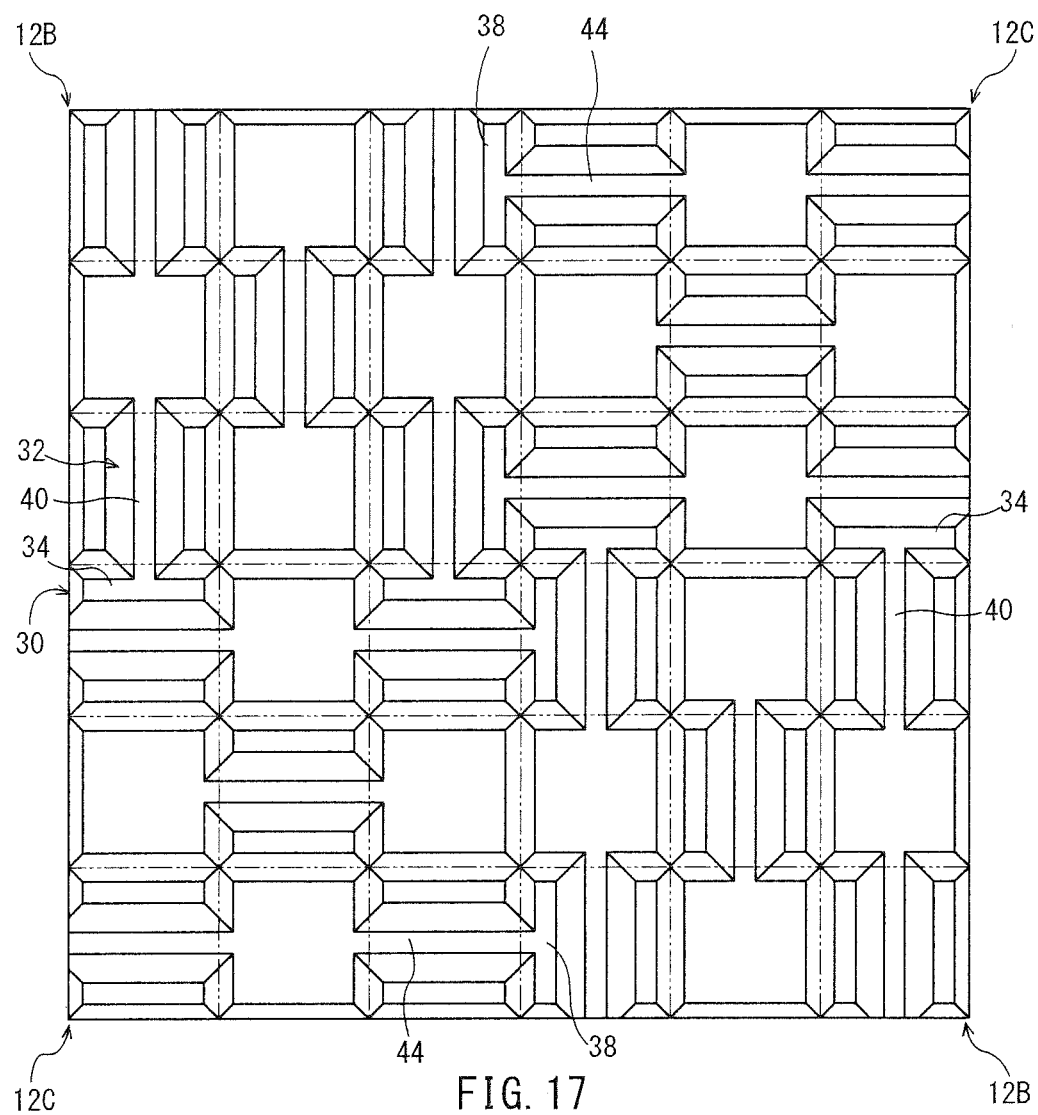
FIG. 17 is an enlarged plan view of some of the plurality of reinforcing units included in a panel in a second embodiment of the present invention.

A plurality of reinforcing units included in a panel in a second embodiment of the present invention will be described with reference to FIGS. 17 to 21. The plurality of reinforcing units include a plurality of reinforcing units 12B and a plurality of reinforcing units 12C. The reinforcing units 12B and 12C are in rows and columns, where the reinforcing units 12B and 12C in each row are arranged alternately and the reinforcing units 12B and 12C in each column are arranged alternately. FIG. 17 shows two rows and two columns of reinforcing units 12B and 12C.

[Reinforcing Unit 12B]

Figure 18:
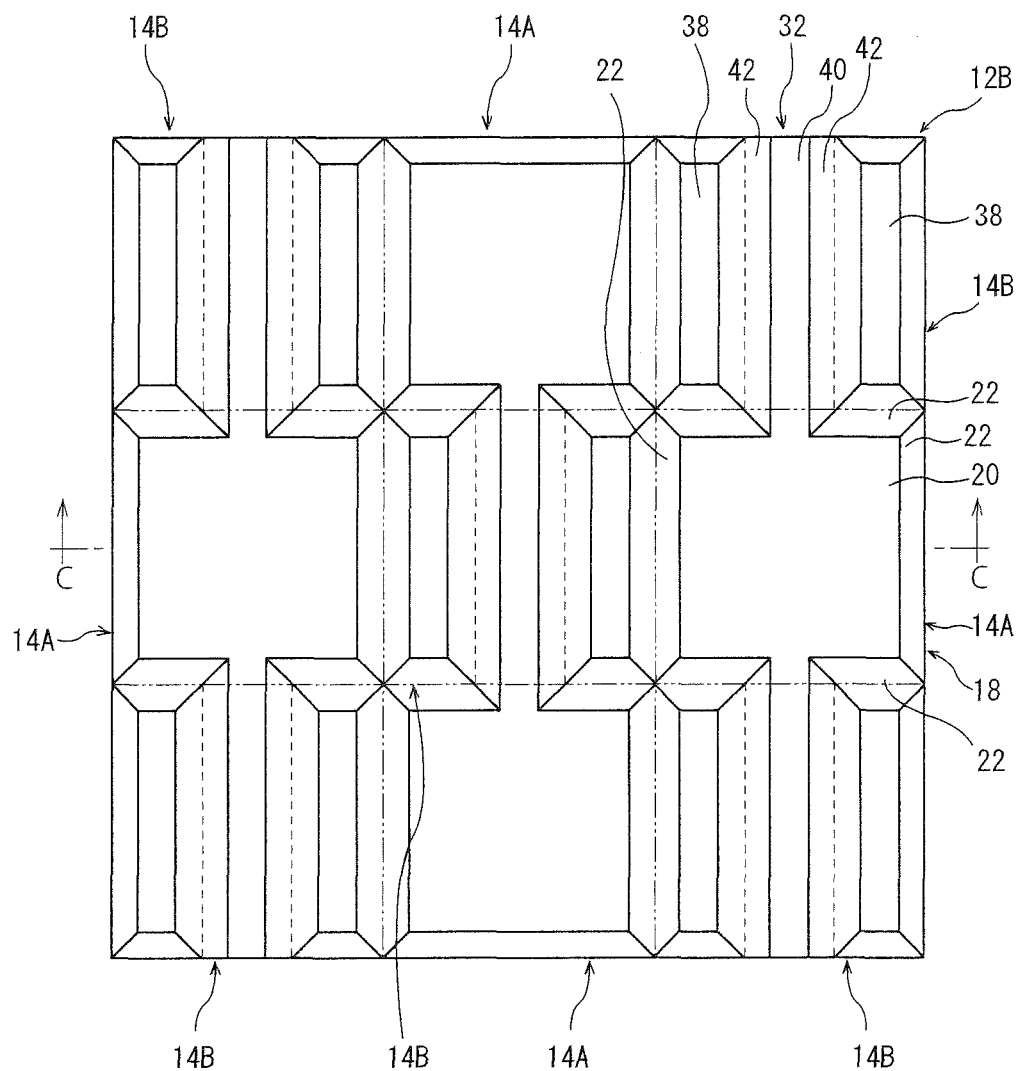
FIG. 18 is a plan view of a reinforcing unit.
Figure 19:
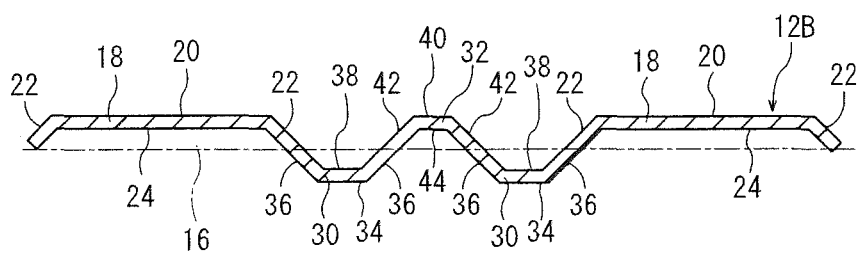
FIG. 19 is a cross-sectional view taken along line C-C of FIG. 18.

A reinforcing unit 12B will be described with reference to FIGS. 18 and 19. The reinforcing unit 12B has first rectangular regions 14A and second rectangular regions 14B in three rows and three columns. Unlike the reinforcing unit 12, the reinforcing unit 12B has fewer first rectangular regions 14A than second rectangular regions 14B. In the reinforcing unit 12B, the reinforcing protrusions 32 extend in the column direction.

[Reinforcing Unit 12C]

Figure 20:
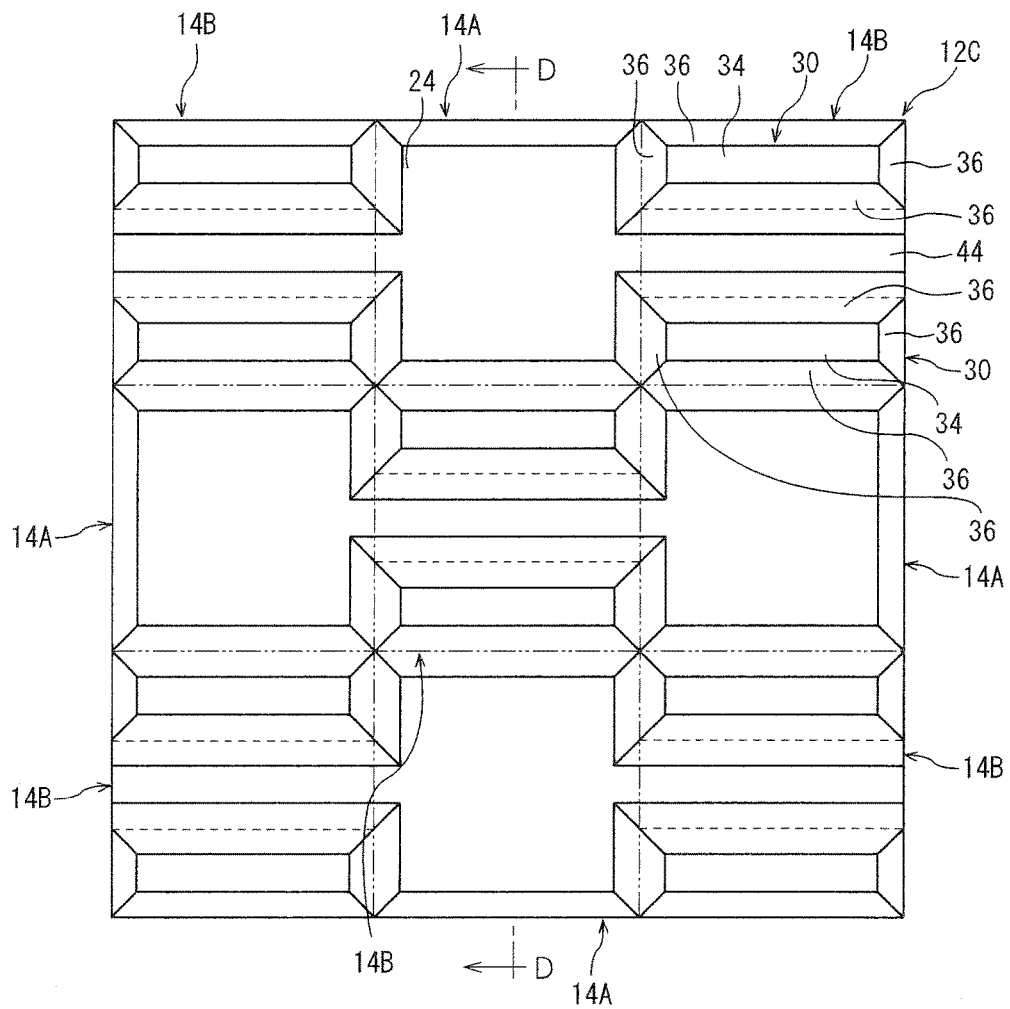
FIG. 20 is a plan view of a reinforcing unit.
Figure 21:
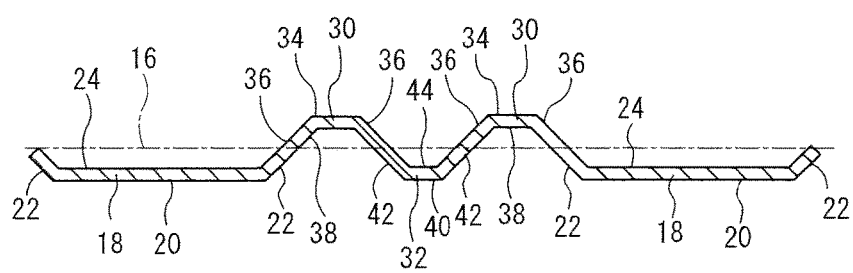
FIG. 21 is a cross-sectional view taken along line D-D of FIG. 20.

A reinforcing unit 12C will be described with reference to FIGS. 20 and 21. The reinforcing unit 12C is obtained by turning a reinforcing unit 12B over and rotating it by 90 degrees. In the reinforcing unit 12C, the first protrusions 18 and reinforcing protrusions 32 protrude in the back direction and the second protrusions 30 protrude in the front direction. In the reinforcing unit 12C, the reinforcing protrusions 32 extend in the row direction.

As shown in FIG. 17, the top surface 40 of the reinforcing protrusion 32 of a second rectangular region 14B in a reinforcing unit 12B is formed in a continuous manner with the top surface 34 of a second protrusion 30 of a second rectangular region 14B in a reinforcing unit 12C. The bottom surface of the recess groove 44 of a second rectangular region 14B in a reinforcing unit 12C is formed in a continuous manner with the bottom surface of a recess 38 of a second rectangular region 14B in a reinforcing unit 12B. That is, although not shown, the top surface 40 of the reinforcing protrusion 32 of a second rectangular region 14B in a reinforcing unit 12C is formed in a continuous manner with the top surface 34 of a second protrusion 30 of a second rectangular region 14B of a reinforcing unit 12B.

There are two positions at each of which the top surface 40 of the reinforcing protrusion 32 of a second rectangular region 14B in a reinforcing unit 12B is formed in a continuous manner with the top surface 34 of a second protrusion 30 of a second rectangular region 14B in a reinforcing unit 12C. Further, there are two positions at each of which the top surface 40 of the reinforcing protrusion 32 of a second rectangular region 14B in a reinforcing unit 12C is formed in a continuous manner with the top surface 34 of a second protrusion 30 of a second rectangular region 14B in a reinforcing unit 12B. Thus, a bending deformation is less likely to occur at the borders between adjacent reinforcing units than in the first embodiment.

Third Embodiment

Figure 22:
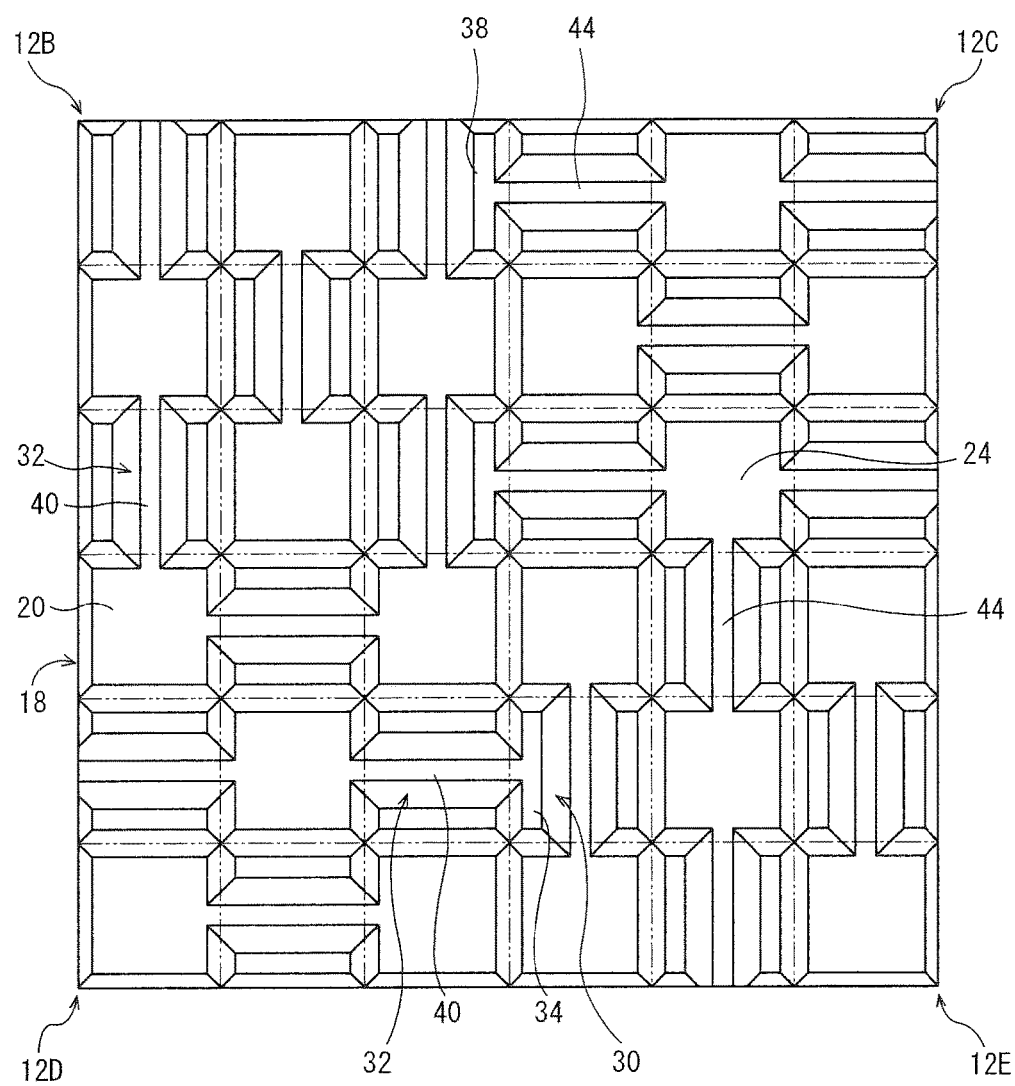
FIG. 22 is an enlarged plan view of some of the plurality of reinforcing units included in a panel in a third embodiment of the present invention.
Figure 26:
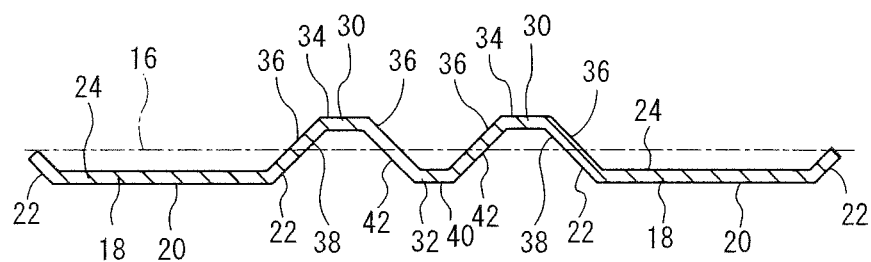
FIG. 26 is a cross-sectional view taken along line F-F of FIG. 25.

A plurality of reinforcing units included in a panel in a third embodiment of the present invention will be described with reference to FIGS. 22 and 26. The plurality of reinforcing units include a plurality of reinforcing units 12B, a plurality of reinforcing units 12C, a plurality of reinforcing units 12D and a plurality of reinforcing units 12E. The reinforcing units 12B and 12C are in rows, where the reinforcing units 12B and 12C in each row are arranged alternately; the reinforcing units 12D and 12E are in rows, where the reinforcing units 12D and 12E in each row are arranged alternately; the reinforcing units 12B and 12D are in columns, where the reinforcing units 12B and 12D in each column are arranged alternately; and the reinforcing units 12C and 12E are in columns, where the reinforcing units 12C and 12E in each column are arranged alternately. FIG. 22 shows two rows and two columns of reinforcing units 12B, 12C, 12D and 12E.

[Reinforcing Unit 12D]

Figure 23:
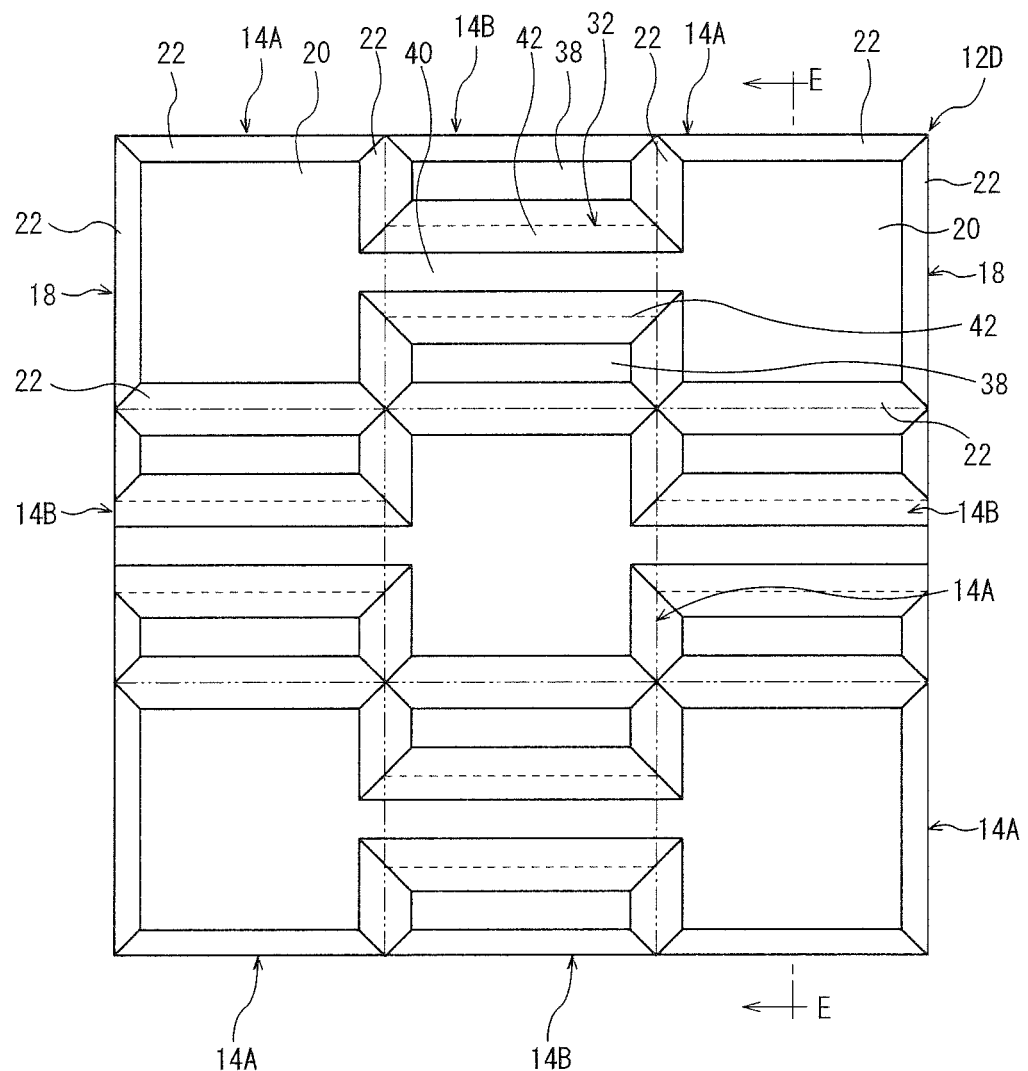
FIG. 23 is a plan view of a reinforcing unit.
Figure 24:
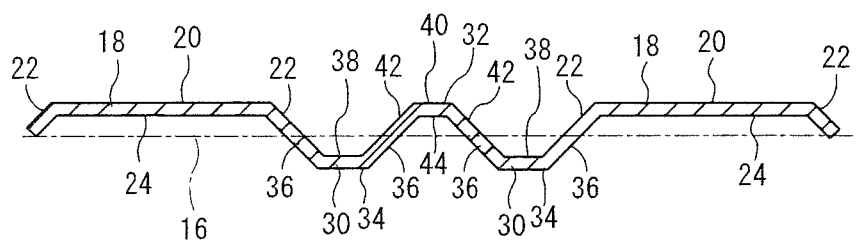
FIG. 24 is a cross-sectional view taken along line E-E of FIG. 23.

A reinforcing unit 12D will be described with reference to FIGS. 23 and 24. Unlike in a reinforcing unit 12, in the reinforcing unit 12D, the reinforcing protrusions 32 extend in the row direction.

[Reinforcing Unit 12E]

Figure 25:
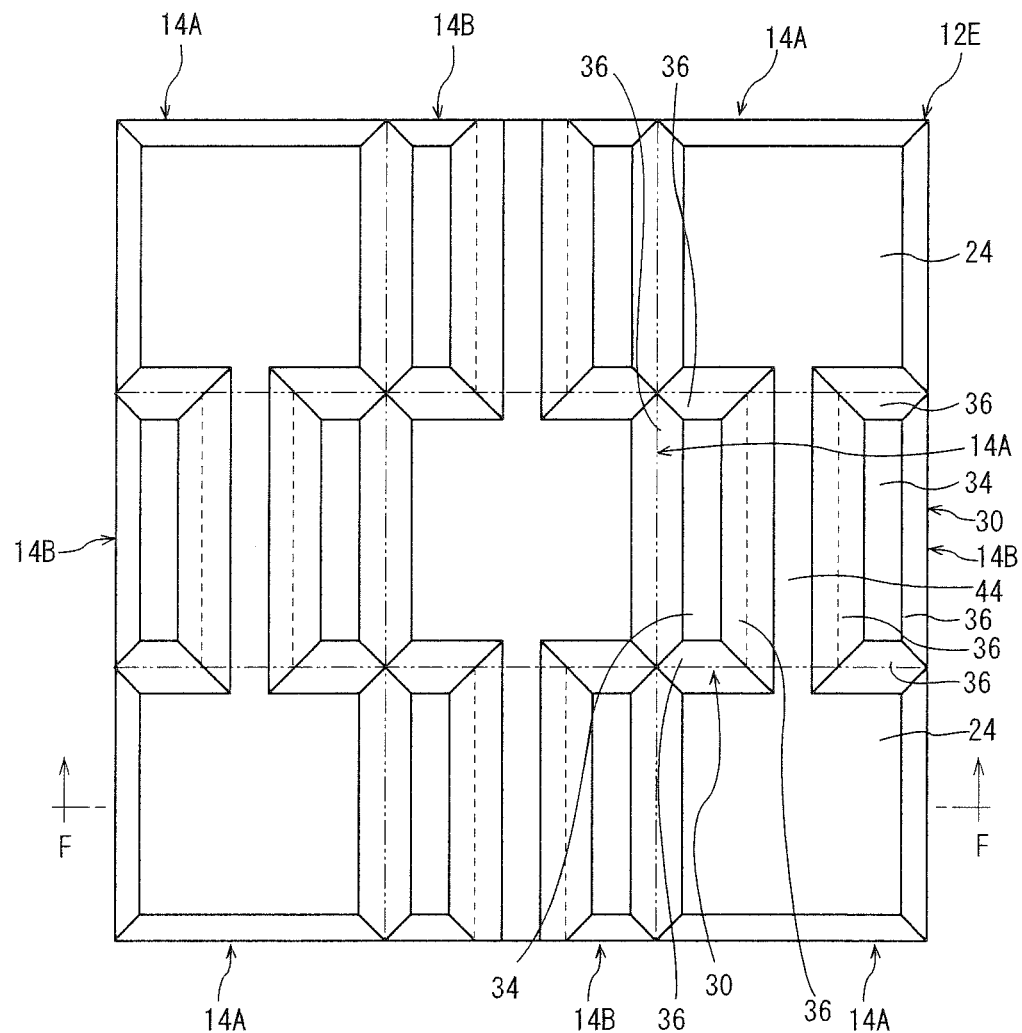
FIG. 25 is a plan view of a reinforcing unit.

A reinforcing unit 12E will be described with reference to FIGS. 25 and 26. The reinforcing unit 12E is obtained by turning a reinforcing unit 12D over and rotating it by 90 degrees. In the reinforcing unit 12E, the first protrusions 18 and reinforcing protrusions 32 protrude in the back direction and the second protrusions 30 protrude in the front direction. In the reinforcing unit 12E, the reinforcing protrusions 32 extend in the column direction.

The top surface 40 of the reinforcing protrusion 32 of a second rectangular region 14B in a reinforcing unit 12B is formed in a continuous manner with the top surface 20 of the first protrusion 18 of a first rectangular region 14A in a reinforcing unit 12D. The bottom surface of the recess groove 44 of a second rectangular region 14B in a reinforcing unit 12C is formed in a continuous manner with the bottom surface of a recess 38 of a second rectangular region 14B in a reinforcing unit 12B. That is, although not shown, the top surface 40 of the reinforcing protrusion 32 of a second rectangular region 14B in a reinforcing unit 12C is formed in a continuous manner with the top surface 34 of a second protrusion 30 of a second rectangular region 14B in a reinforcing unit 12B. The top surface 40 of the reinforcing protrusion 32 of a second rectangular region 14B in a reinforcing unit 12D is formed in a continuous manner with the top surface 34 of the second protrusion 30 of a second rectangular region 14B in a reinforcing unit 12E. The bottom surface of the recess groove 44 of a second rectangular region 14B in a reinforcing unit 12E is formed in a continuous manner with the bottom surface of the recess 24 of a first rectangular region 14A in a reinforcing unit 12C. That is, although not shown, the top surface 40 of the reinforcing protrusion 32 of a second rectangular region 14B in a reinforcing unit 12E is formed in a continuous manner with the top surface 20 of the first protrusion 18 of a first rectangular region 14A in a reinforcing unit 12C.

There are two positions at each of which the top surface 40 of the reinforcing protrusion 32 of a second rectangular region 14B in a reinforcing unit 12B is formed in a continuous manner with the top surface 20 of the first protrusion 18 of a first rectangular region 14A in a reinforcing unit 12D. Further, there are two positions at each of which the top surface 40 of the reinforcing protrusion 32 of a second rectangular region 14B in a reinforcing unit 12C is formed in a continuous manner with the top surface 34 of a second protrusion 30 of a second rectangular region 14B in a reinforcing unit 12B. Thus, deformation is less likely to occur at the borders between adjacent reinforcing units than in the first embodiment.

Fourth Embodiment

Figure 27:
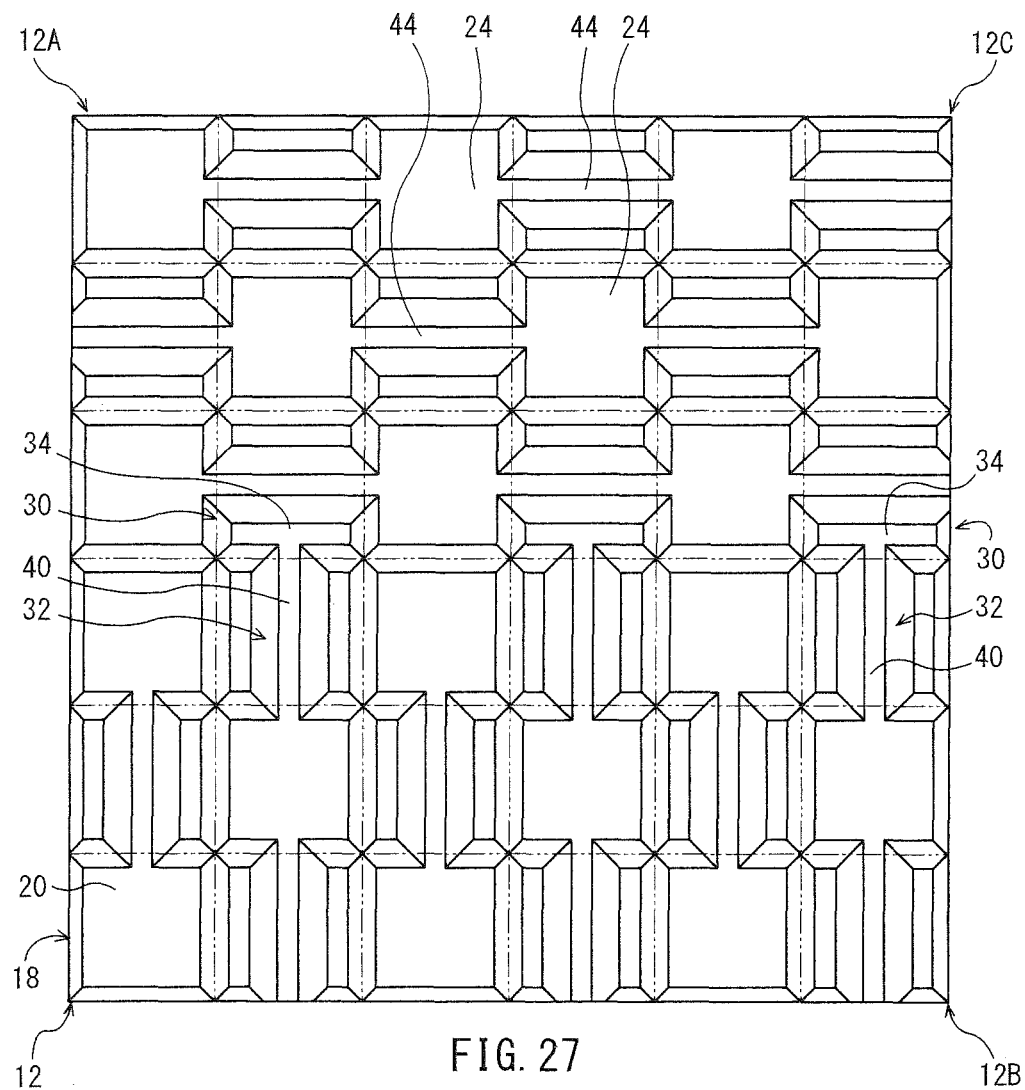
FIG. 27 is an enlarged plan view of some of the plurality of reinforcing units included in a panel in a fourth embodiment of the present invention.

A plurality of reinforcing units included in a panel in a fourth embodiment of the present invention will be described with reference to FIG. 27. The plurality of reinforcing units include a plurality of reinforcing units 12, a plurality of reinforcing units 12A, a plurality of reinforcing units 12B and a plurality of reinforcing units 12C. The reinforcing units 12 and 12A are in columns, where the reinforcing units 12 and 12A in each column are arranged alternately; the reinforcing units 12B and 12C are in columns, where the reinforcing units 12B and 12C in each column are arranged alternately; the reinforcing units 12 and 12B are in rows, where the reinforcing units 12 and 12B in each row are arranged alternately; and the reinforcing units 12A and 12C are in rows, where the reinforcing units 12A and 12C in each row are arranged alternately. FIG. 27 shows two rows and two columns of reinforcing units 12, 12A, 12B and 12C.

The top surface 40 of the reinforcing protrusion 32 of a second rectangular region 14B in a reinforcing unit 12 is formed in a continuous manner with the top surface 34 of a second protrusion 30 of a second rectangular region 14B in a reinforcing unit 12A. The bottom surface of the recess groove 44 of a second rectangular region 14B in a reinforcing unit 12A is formed in a continuous manner with the bottom surface of the recess 24 of a first rectangular region 14A in a reinforcing unit 12C. That is, although not shown, the top surface 40 of the reinforcing protrusion 32 of a second rectangular region 14B in a reinforcing unit 12A is formed in a continuous manner with the top surface 20 of the first protrusion 18 of a first rectangular region 14A in a reinforcing unit 12C. The bottom surface of the recess groove 44 of a second rectangular region 14B in a reinforcing unit 12C is formed in a continuous manner with the bottom surface of the recess 24 of a first rectangular region 14A in a reinforcing unit 12A. That is, although not shown, the top surface 40 of the reinforcing protrusion 32 of a second rectangular region 14B in a reinforcing unit 12C is formed in a continuous manner with the top surface 20 of the first protrusion 18 of a first rectangular region 14A in a reinforcing unit 12A. The top surface 40 of the reinforcing protrusion 32 of a second rectangular region 14B in a reinforcing unit 12B is formed in a continuous manner with the top surface 34 a second protrusion 30 of a second rectangular region 14B in a reinforcing unit 12C.

There are two positions at each of which the top surface 40 of the reinforcing protrusion 32 of a second rectangular region 14B in a reinforcing unit 12B is formed in a continuous manner with the top surface 34 of the second protrusion 30 of a second rectangular region 14B in a reinforcing unit 12C. Further, there is one position at which the top surface 40 of the reinforcing protrusion 32 of a second rectangular region 14B in a reinforcing unit 12 is formed in a continuous manner with the top surface 34 of a second protrusion 30 of a second rectangular region 14B in a reinforcing unit 12A. Further, there are two positions at each of which the top surface 40 of the reinforcing protrusion 32 of a second rectangular region 14B in a reinforcing unit 12C is formed in a continuous manner with the top surface 20 of the first protrusion 18 of a first rectangular region 14A in a reinforcing unit 12A. Furthermore, there is one position at which the top surface 40 of the reinforcing protrusion 32 of a second rectangular region 14B in a reinforcing unit 12A is formed in a continuous manner with the top surface 20 of the first protrusion 18 of a first rectangular region 14A in a reinforcing unit 12C. Thus, deformation is less likely to occur at the borders between adjacent reinforcing units (especially the borders between the reinforcing units 12A and 12C and the borders between the reinforcing units 12B and 12C) than in the first embodiment.

Fifth Embodiment

Figure 28:
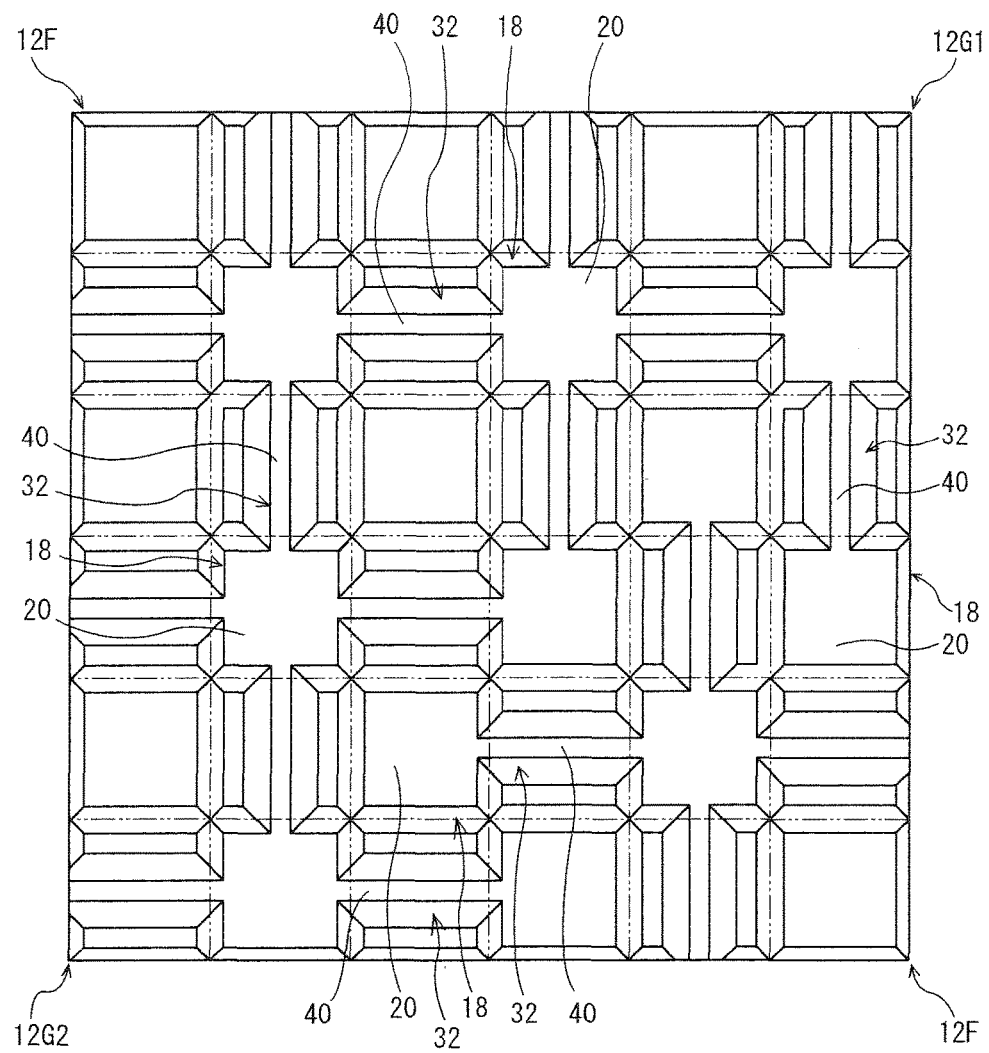
FIG. 28 is an enlarged plan view of some of the plurality of reinforcing units included in a panel in a fifth embodiment of the present invention.

A plurality of reinforcing units included in a panel in a fifth embodiment of the present invention will be described with reference to FIGS. 28 to 32. The plurality of reinforcing units include a plurality of reinforcing units 12F, a plurality of reinforcing units 12G1 and a plurality of reinforcing units 12G2. The reinforcing units 12F and 12G1 are in rows and columns, where the reinforcing units 12 and 12G1 in each row are arranged alternately and the reinforcing units 12 and 12G1 in each column are arranged alternately. The reinforcing units 12F and 12G2 are in rows and column, where the reinforcing units 12F and 12G2 in each row are arranged alternately and the reinforcing units 12F and 12G2 in each column are arranged alternately. The reinforcing units 12G1 and 12G2 are in diagonal series, where the reinforcing units 12G1 and 12G2 in each diagonal series are arranged alternately. FIG. 28 shows two rows and two columns of reinforcing units 12F, 12G1 and 12G2.

[Reinforcing Unit 12F]

Figure 29:
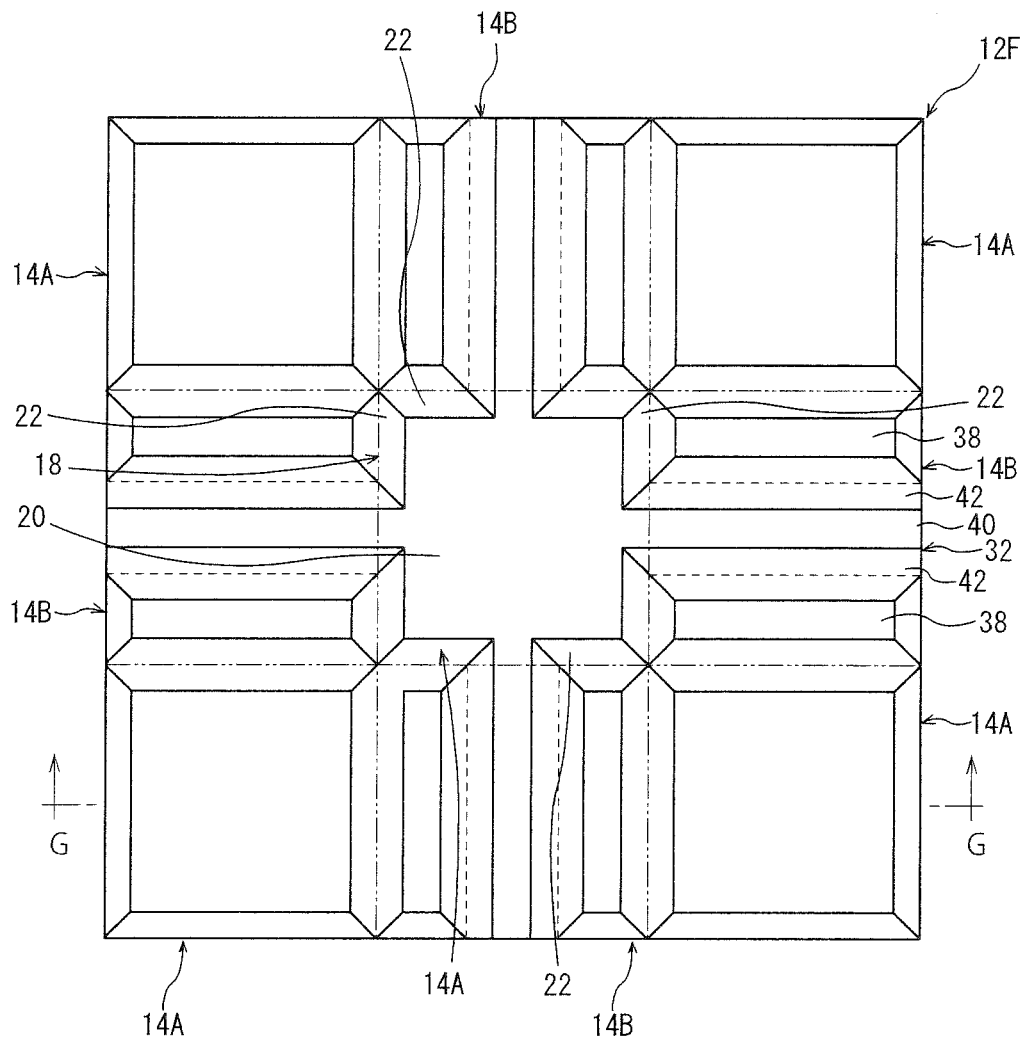
FIG. 29 is a plan view of a reinforcing unit.
Figure 30:
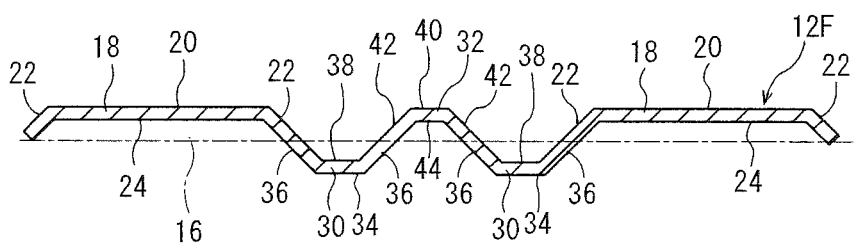
FIG. 30 is a cross-sectional view taken along line G-G of FIG. 29.

A reinforcing unit 12F will be described with reference to FIGS. 29 and 30. Unlike in a reinforcing unit 12, in the reinforcing unit 12F, two of the four reinforcing protrusions 32 extend in the row direction.

[Reinforcing Unit 12G1]

Figure 31:
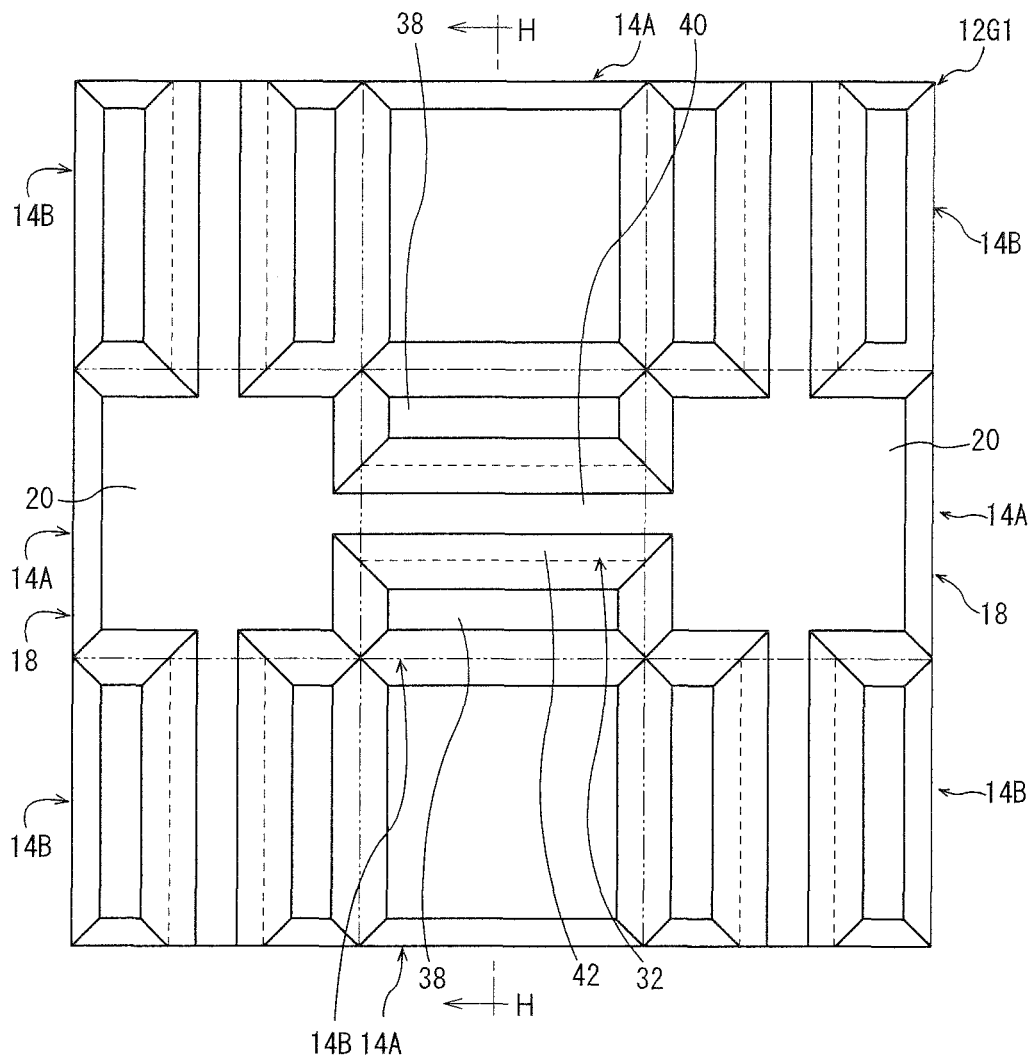
FIG. 31 is a plan view of a reinforcing unit.
Figure 32:
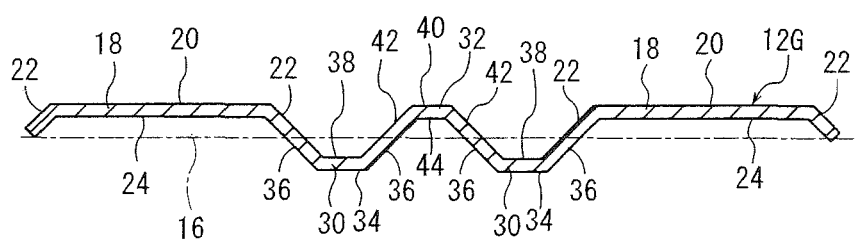
FIG. 32 is a cross-sectional view taken along line H-H of FIG. 31.

A reinforcing unit 12G1 will be described with reference to FIGS. 31 and 32. Unlike in a reinforcing unit 12B, in the reinforcing unit 12G1, one of the five reinforcing protrusions 32 extends in the row direction.

[Reinforcing Unit 12G2]

A reinforcing unit 12G2 is obtained by rotating a reinforcing unit 12G1 by 90 degrees.

The top surface 40 of the reinforcing protrusion 32 of a second rectangular region 14B in a reinforcing unit 12F is formed in a continuous manner with the top surface 20 of the first protrusion 18 of a first rectangular region 14A in a reinforcing unit 12G1. The top surface 40 of the reinforcing protrusion 32 of a second rectangular region 14B in a reinforcing unit 12G1 or 12G2 is formed in a continuous manner with the top surface 20 of the first protrusion 18 of a first rectangular region 14A in a reinforcing unit 12F. The top surface 40 of the reinforcing protrusion 32 of a second rectangular region 14B in a reinforcing unit 12G2 is formed in a continuous manner with the top surface 20 of the first protrusion 18 of a first rectangular region 14A in a reinforcing unit 12F. The top surface 40 of the reinforcing protrusion 32 of a second rectangular region 14B in a reinforcing unit 12F is formed in a continuous manner with the top surface 20 of the first protrusion 18 of a first rectangular region 14A in a reinforcing unit 12G2.

Each of the reinforcing units 12F, 12G1 and 12G2 has one or more reinforcing protrusions 32 extending in the row direction and one or more reinforcing protrusions 32 extending in the column direction. This prevents second moment of area from decreasing at the borders, in the column direction, between the first and second rectangular regions 14A and 14B in each of the reinforcing units 12F, 12G1 and 12G2, and prevents second moment of area from decreasing at the borders, in the row direction, between the first and second rectangular regions 14A and 14B. Thus, a bending deformation is unlikely to occur at these borders.

Sixth Embodiment

Figure 33:
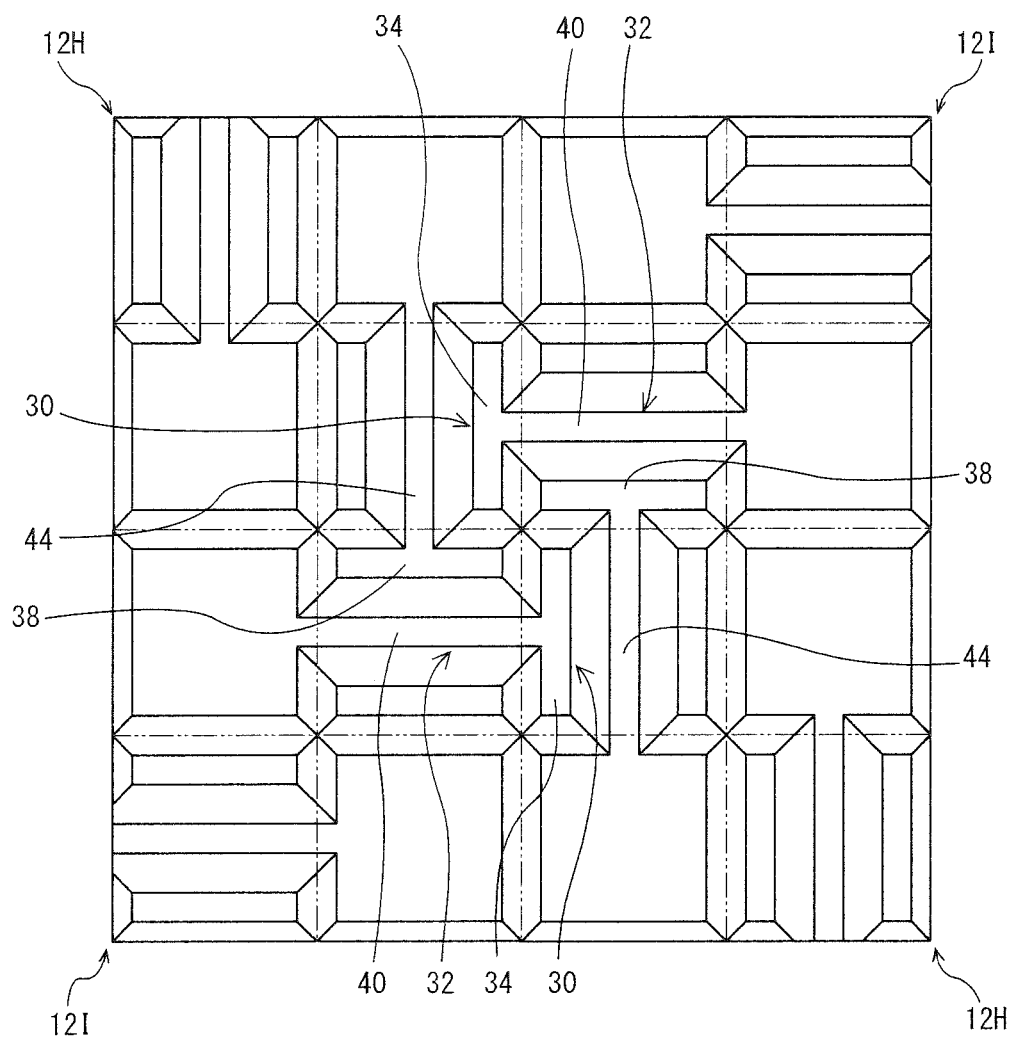
FIG. 33 is an enlarged plan view of some of the plurality of reinforcing units included in a panel in a sixth embodiment of the present invention.

A plurality of reinforcing units included in a panel in a sixth embodiment of the present invention will be described with reference to FIGS. 33 to 37. The plurality of reinforcing units include a plurality of reinforcing units 12H and a plurality of reinforcing units 12I. The reinforcing units 12H and 12I are in rows and column, where the reinforcing units 12H and 12I in each row are arranged alternately and the reinforcing units 12H and 12I in each column are arranged alternately. FIG. 33 shows two rows and two columns of reinforcing units 12H and 12I.

[Reinforcing Unit 12H]

Figure 34:
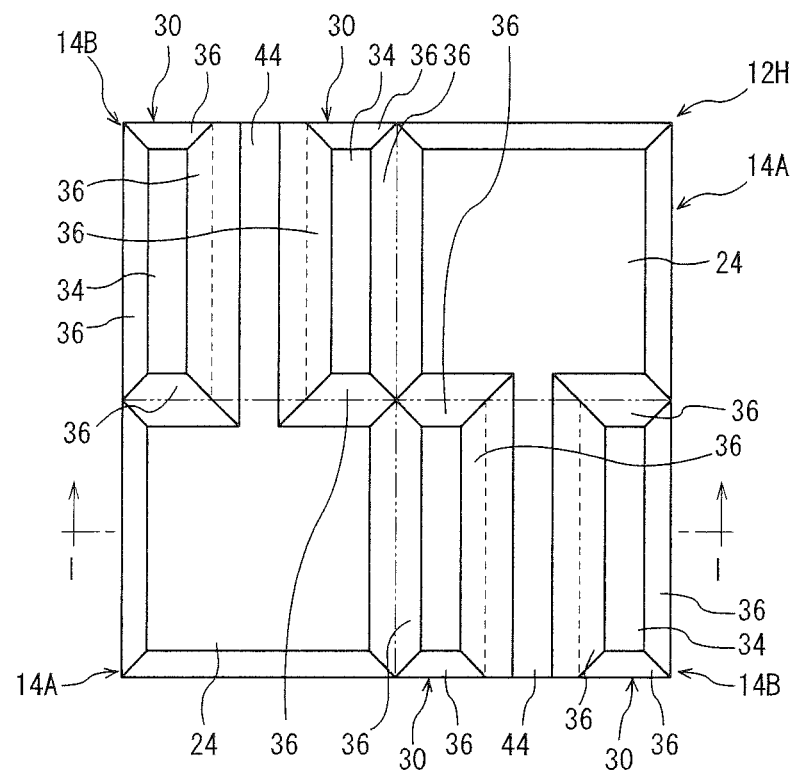
FIG. 34 is a plan view of a reinforcing unit.
Figure 35:
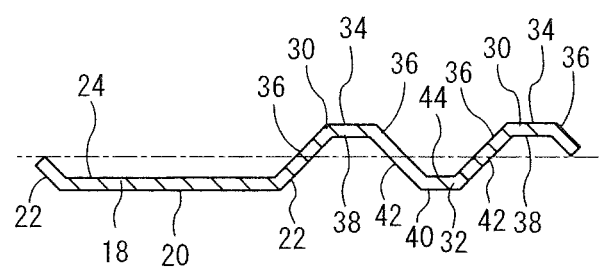
FIG. 35 is a cross-sectional view taken along line I-I of FIG. 34.

A reinforcing unit 12H will be described with reference to FIGS. 34 and 35. The reinforcing unit 12H has two first rectangular regions 14A and two second rectangular regions 14B disposed in two rows and two columns. That is, in the reinforcing unit 12H, the first and second rectangular regions 14A and 14B in each row are arranged alternately and the first and second rectangular regions 14A and 14B in each column are arranged alternately. Further, in the reinforcing unit 12H, the reinforcing protrusion 32 of each second rectangular region 14B extends in the column direction.

[Reinforcing Unit 12I]

Figure 36:
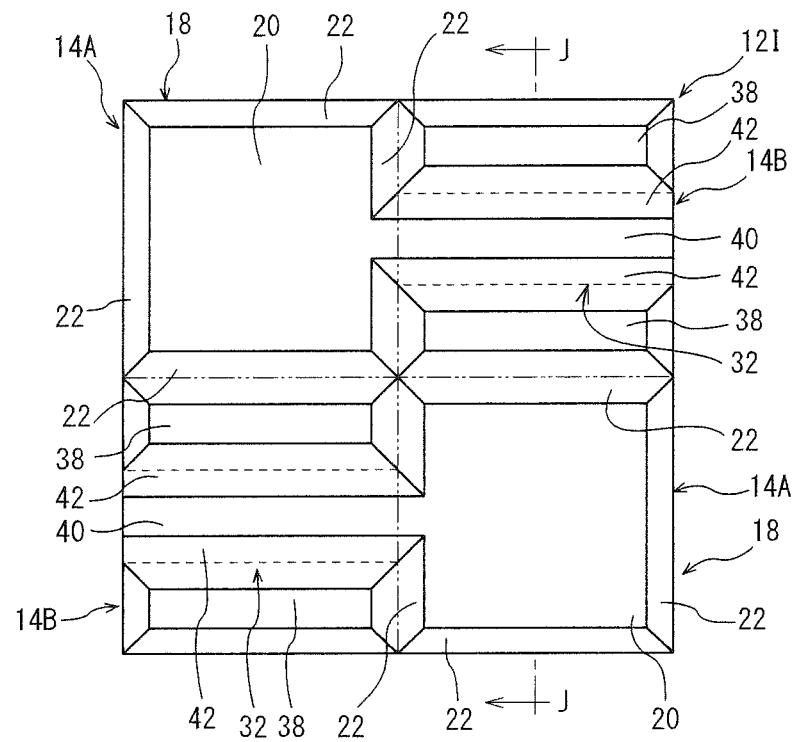
FIG. 36 is a plan view of a reinforcing unit.
Figure 37:
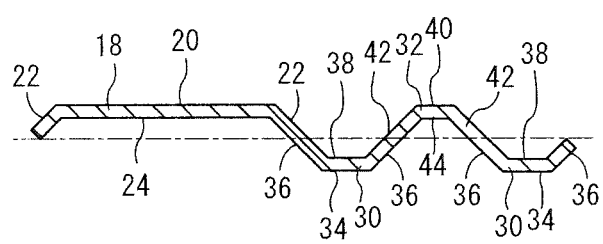
FIG. 37 is a cross-sectional view taken along line J-J of FIG. 36.

A reinforcing unit 12I will be described with reference to FIGS. 36 and 37. The reinforcing unit 12I is obtained by turning a reinforcing unit 12H over and changing the direction in which the reinforcing protrusion 32 of each second rectangular region 14B extends to the row direction.

The top surface 40 of the reinforcing protrusion 32 of a second rectangular region 14B in a reinforcing unit 12I is formed in a continuous manner with the top surface 34 of a second protrusion 30 of a second rectangular region 14B in a reinforcing unit 12H. The bottom surface of the recess groove 44 of a second rectangular region 14B in a reinforcing unit 12H is formed in a continuous manner with the bottom surface of a recess 38 of a second rectangular region 14B in a reinforcing unit 12I. That is, although not shown, the top surface 40 of the reinforcing protrusion 32 of a second rectangular region 14B in a reinforcing unit 12H is formed in a continuous manner with the top surface 34 of a second protrusion 30 of a second rectangular region 14B in a reinforcing unit 12I.

Seventh Embodiment

Figure 38:
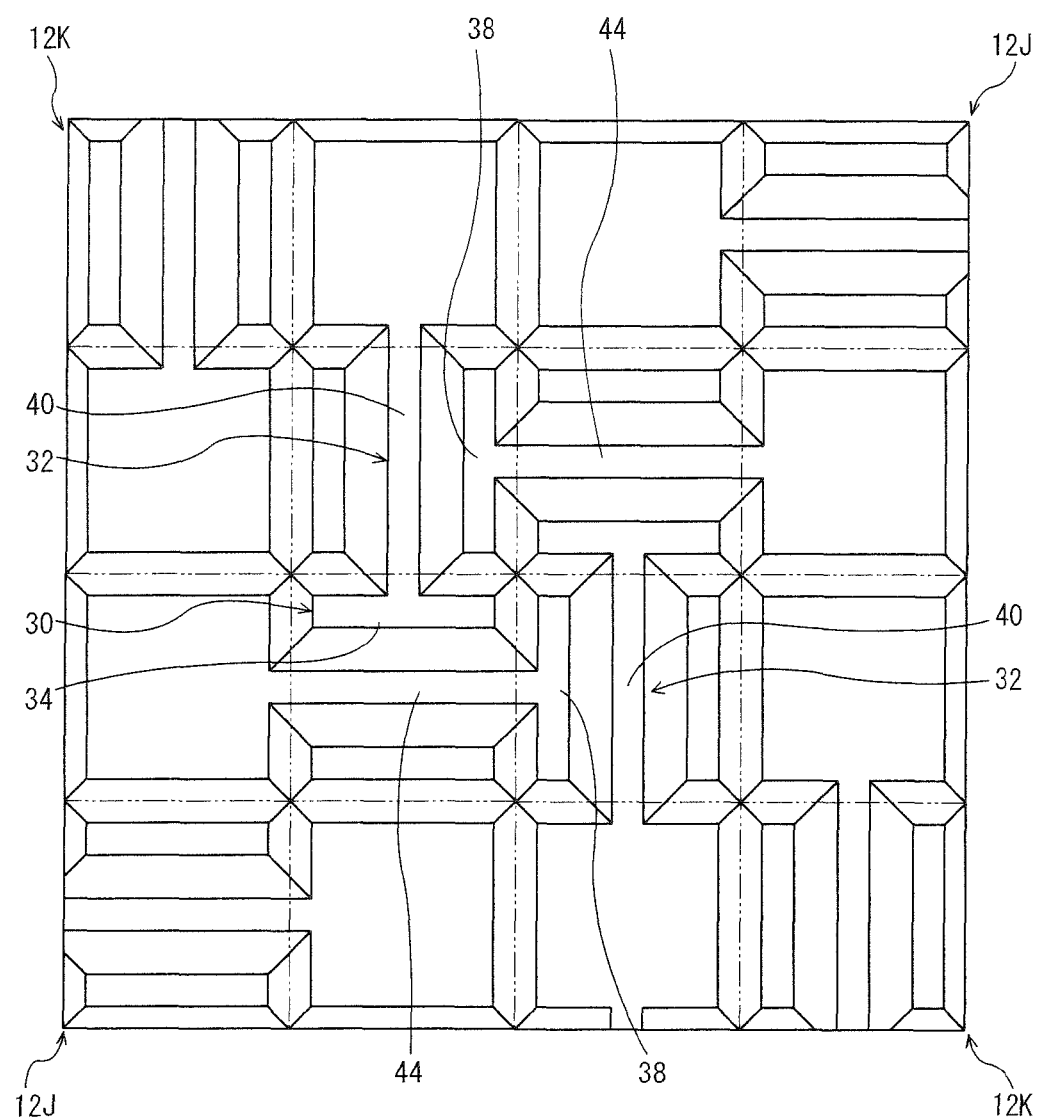
FIG. 38 is an enlarged plan view of some of the plurality of reinforcing units included in a panel in a seventh embodiment of the present invention.

A plurality of reinforcing units included in a panel in a seventh embodiment of the present invention will be described with reference to FIGS. 38 to 42. The plurality of reinforcing units include a plurality of reinforcing units 12J and a plurality of reinforcing units 12K. The reinforcing units 12J and 12K are in rows and columns, where the reinforcing units 12J and 12K in each row are arranged alternately and the reinforcing units 12J and 12K in each column are arranged alternately. FIG. 38 shows two rows and two columns of reinforcing units 12J and 12K.

[Reinforcing Unit 12J]

Figure 39:
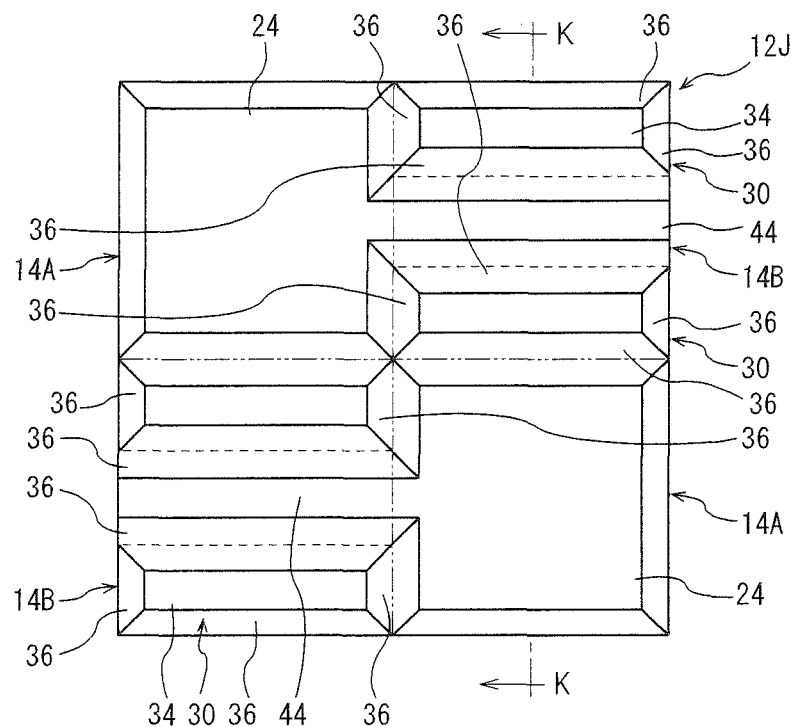
FIG. 39 is a plan view of a reinforcing unit.
Figure 40:
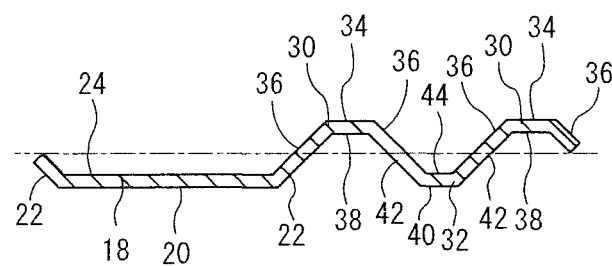
FIG. 40 is a cross-sectional view taken along line K-K of FIG. 39.

A reinforcing unit 12J will be described with reference to FIGS. 39 and 40. The reinforcing unit 12J is obtained by rotating a reinforcing unit 12H by 90 degrees.

[Reinforcing Unit 12K]

Figure 41:
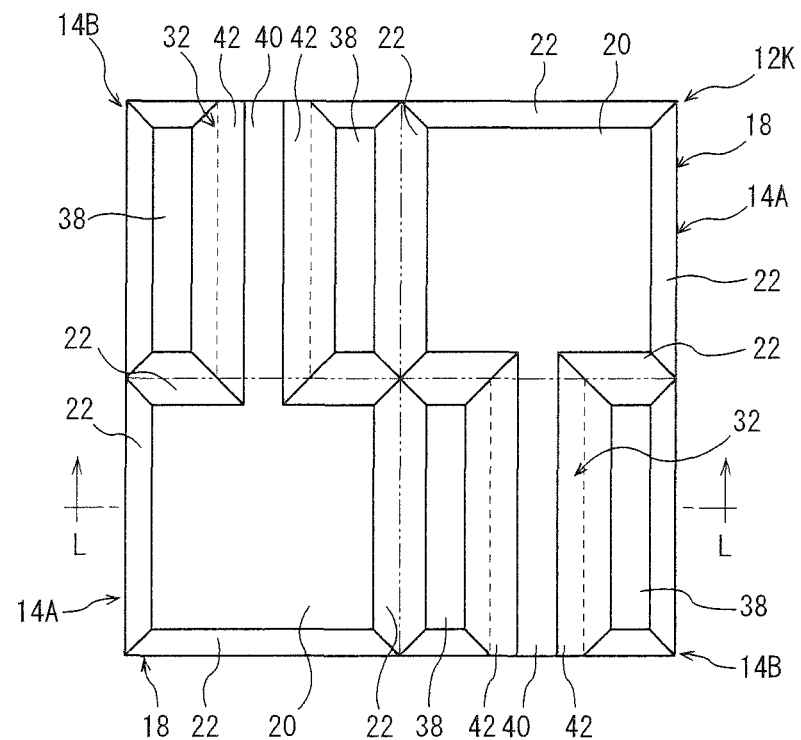
FIG. 41 is a plan view of a reinforcing unit.
Figure 42:
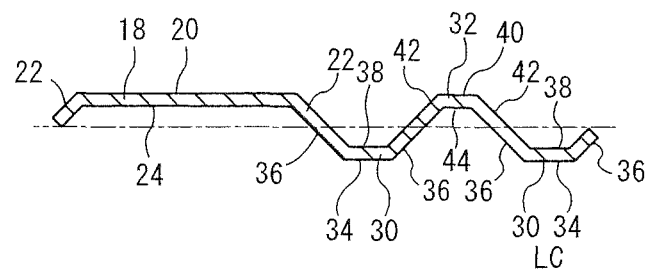
FIG. 42 is a cross-sectional view taken along line K-K of FIG. 41.

A reinforcing unit 12K will be described with reference to FIGS. 41 and 42. The reinforcing unit 12K is obtained by rotating a reinforcing unit 12I by 90 degrees.

The top surface 40 of the reinforcing protrusion 32 of a second rectangular region 14B in a reinforcing unit 12K is formed in a continuous manner with the top surface 34 of a second protrusion 30 of a second rectangular region 14B in a reinforcing unit 12J. The bottom surface of the recess groove 44 of a second rectangular region 14B in a reinforcing unit 12J is formed in a continuous manner with the bottom surface of a recess 38 of a second rectangular region 14B in a reinforcing unit 12K. That is, although not shown, the top surface 40 of the reinforcing protrusion 32 of a second rectangular region 14B in a reinforcing unit 12J is formed in a continuous manner with the top surface 34 of a second protrusion 30 of a second rectangular region 14B in a reinforcing unit 12K.

Although embodiments of the present invention have been described in detail, these embodiments are merely examples and the present invention is not limited in any way to the above embodiments.

The shape and use of the panel is not limited to any particular ones as long as the panel includes a portion where a reinforcing unit can be formed. For example, the panel may be used as a panel component in a floor panel, door interior panel, dash panel, trunk lid interior panel, hood interior panel or other panels of an automobile, or may be used as a member constituting a part of the frame of an automobile. Alternatively, the panel may be used as a building material or used in consumer electronics. The panel may include a flat frame-shaped portion that surrounds all the reinforcing units. The panel may be joined to another member using this frame-shaped portion. Reinforcing units may be present along edges of the panel. In this case, parts of the reinforcing units may be cut off. The panel may be made of, for example, a metal such as steel, aluminum alloy, titanium and stainless steel, or a synthetic resin.

The panel is only required to have reinforcing units in portions where a certain strength is needed. For example, it is advantageous if some portions of the edges of the panel of FIG. 1 are flat if the panel is expected to be joined to another member or subjected to another treatment such as bending or cutting.

The arrangement of reinforcing units is determined depending on the shape and size of the portions of the panel where the reinforcing units are to be provided, for example. Reinforcing units may be provided on a flat surface or a curved surface. If the panel is made of metal, reinforcing units can be easily formed by plastic working such as press working or rolling. The panel may be heated to improve the formability of the panel, for example by warm pressing or hot stamping, and then subjected to press working. If the panel is made of a synthetic resin, reinforcing units can be easily formed by injection molding or hot stamping.

The panel need not include a plurality of reinforcing units. For example, the panel may include one reinforcing unit.

A second rectangular region may include a plurality of reinforcing protrusions. This will further prevent second moment of area from decreasing at the borders between the first and second rectangular regions compared with implementations where a second rectangular region includes only one reinforcing protrusion. As a result, a bending deformation is still less likely to occur at the borders between the first and second rectangular regions.

In the embodiments described above, the first and second rectangular regions 14A and 14B are arranged in two rows and two columns or in three rows and three columns; however, the arrangement of first and second rectangular regions 14A and 14B is not limited to these arrangements. For example, an arrangement may have four or more rows and columns. Further, the number of rows may be different from the number of columns. The arrangement of first and second rectangular regions 14A and 14B is determined depending on the shape and size of the portions of the panel 10 where the reinforcing units are to be provided, for example.

The invention claimed is:

1. A panel comprising a reinforcing unit including a plurality of first rectangular regions and a plurality of second rectangular regions, wherein:
    the first and second rectangular regions are in rows and columns, the first and second rectangular regions in each row being arranged alternately and the first and second rectangular regions in each column being arranged alternately,
    each of the first rectangular regions includes a first protrusion fully covering the first rectangular region and protruding in a first direction perpendicular to an imaginary reference plane and having a flat top surface,
    each of the second rectangular regions includes:
    a second protrusion partially covering the second rectangular region and protruding in a second direction opposite to the first direction and having a flat top surface; and
    a reinforcing protrusion partially covering the second rectangular region and extending between opposite sides and protruding in the first direction and having a flat top surface, and
    the flat top surface of the reinforcing protrusion and the flat top surface of the first protrusion lying in the same plane.

2. The panel according to claim 1, wherein one reinforcing protrusion extends along a row and another reinforcing protrusion extends along a column.

3. The panel according to claim 1, wherein a number of the first rectangular regions is larger than a number of the second rectangular regions.

4. The panel according to claim 1, wherein a ratio between a number of the first rectangular regions and a number of the second rectangular regions ranges from 4:6 to 6:4.

5. The panel according to claim 1, wherein each of the first rectangular regions and the second rectangular regions is square in shape in plan view.

6. A panel comprising a reinforcing unit including a plurality of first rectangular regions and a plurality of second rectangular regions, wherein:
    the first and second rectangular regions are in rows and columns, the first and second rectangular regions in each row being arranged alternately and the first and second rectangular regions in each column being arranged alternately, each of the first rectangular regions includes a fully-covering first protrusion protruding in a first direction perpendicular to an imaginary reference plane and having a flat top surface, each of the second rectangular regions includes:

a partially covering second protrusion protruding in a second direction opposite to the first direction and having a flat top surface; and a partially covering reinforcing protrusion extending between opposite sides and protruding in the first direction and having a flat top surface, and the flat top surface of the reinforcing protrusion forms one face together with the top surface of the first protrusion, wherein:

a plurality of reinforcing units are provided, the plurality of reinforcing units are arranged in rows and/or columns, and, for two adjacent reinforcing units, a top surface of a reinforcing protrusion of a second rectangular region included in one reinforcing unit forms one face together with a top surface of a second protrusion of a second rectangular region included in the other reinforcing unit or a top surface of a first protrusion of a first rectangular region included in the other reinforcing unit.

7. The panel according to claim 6, wherein:

the reinforcing protrusion of the second rectangular region included in the one reinforcing unit extends along a row, and a reinforcing protrusion of the second rectangular region included in the other reinforcing unit extends along a column.

8. The panel according to claim 6, wherein each of the reinforcing units has three rows and three columns of first and second rectangular regions.

9. The panel according to claim 8, wherein five first rectangular regions are provided and four second rectangular regions are provided.

10. The panel according to claim 8, wherein four first rectangular regions are provided and five second rectangular regions are provided.

11. The panel according to claim 6, wherein each of the reinforcing units has two rows and two columns of first and second rectangular regions.

12. The panel according to claim 11, wherein two first rectangular regions are provided and two second rectangular regions are provided.

* * * * *